(12) United States Patent
Kewitsch

(10) Patent No.: US 7,289,197 B2
(45) Date of Patent: Oct. 30, 2007

(54) TRANSMISSIVE OPTICAL DETECTOR

(76) Inventor: Anthony Stephen Kewitsch, 515 Ocean Ave. Unit 505-S, Santa Monica, CA (US) 90402

( * ) Notice: Subject to any disclaimer, the term of this patent is extended or adjusted under 35 U.S.C. 154(b) by 0 days.

(21) Appl. No.: 11/306,203

(22) Filed: Dec. 20, 2005

(65) Prior Publication Data
US 2006/0197943 A1     Sep. 7, 2006

Related U.S. Application Data

(60) Provisional application No. 60/638,568, filed on Dec. 22, 2004.

(51) Int. Cl.
*G01N 21/00* (2006.01)
(52) U.S. Cl. .................................................... 356/73.1

(58) Field of Classification Search ................... None
See application file for complete search history.

(56) References Cited

U.S. PATENT DOCUMENTS 4,556,875 A * 12/1985 Ishiwatari ................... 340/679

* cited by examiner

*Primary Examiner*—Tu T Nguyen
(74) *Attorney, Agent, or Firm*—Raymond A. Bogucki

(57) ABSTRACT

In this invention, a transmissive optical detector for low loss monitoring of transmitted optical power is described. The optical detector consists of a partially absorbing coating whose electrical characteristics change under illumination while letting most of the optical power pass through unperturbed. The coating is, for example, a transparent conductor such as indium tin oxide coated on the endface of a fiberoptic waveguide.

23 Claims, 18 Drawing Sheets electrical output
(analog or digital)

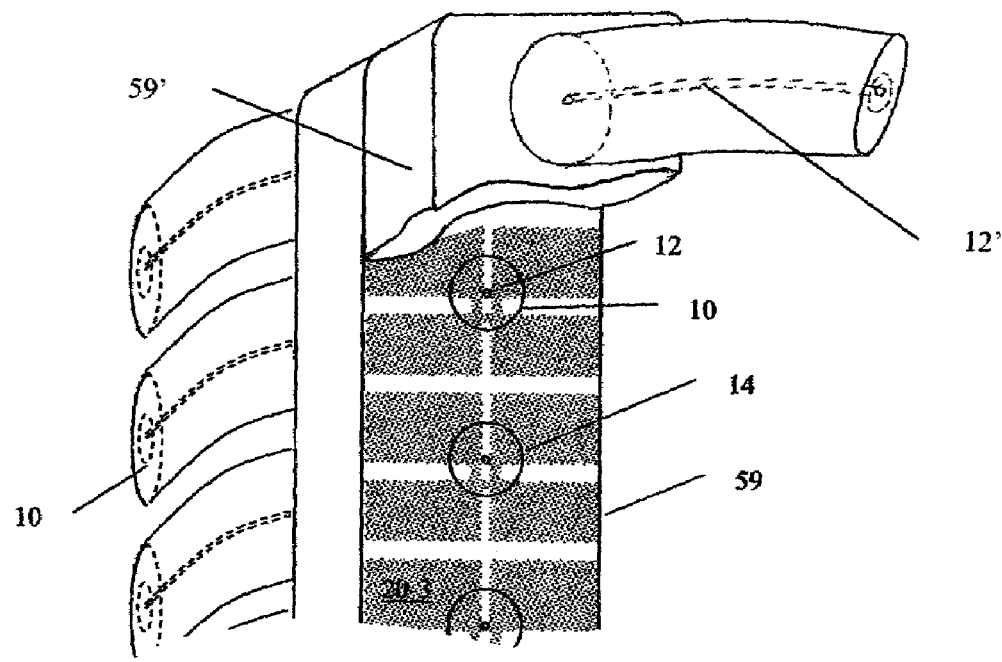
FIG. 9
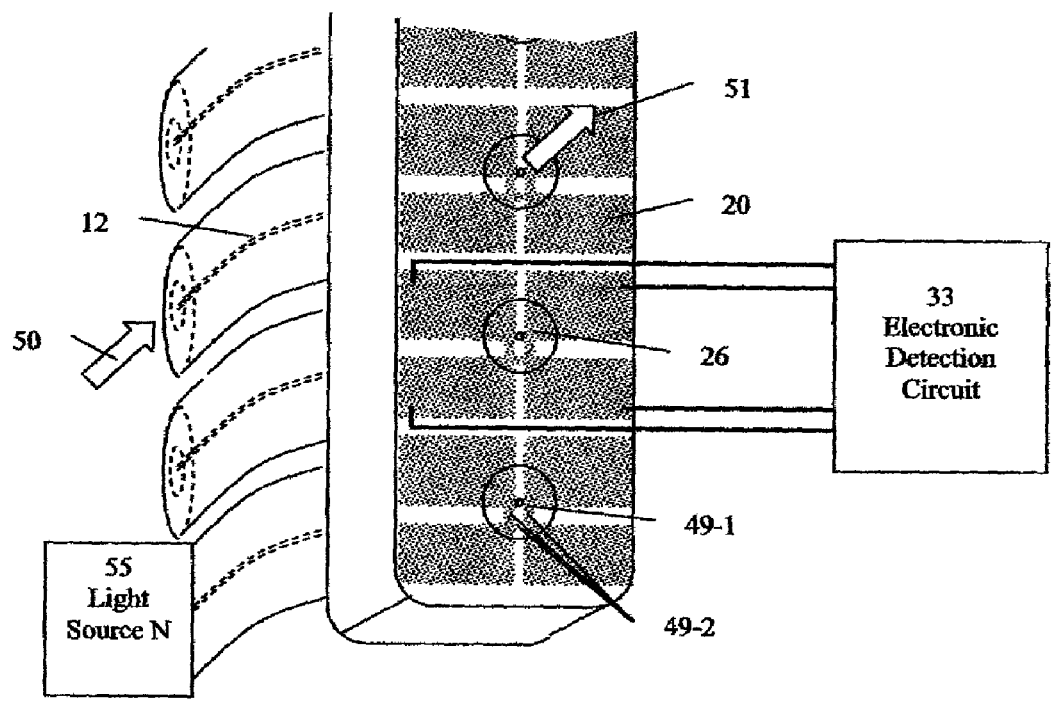

US 7,289,197 B2

TRANSMISSIVE OPTICAL DETECTOR

REFERENCE TO RELATED APPLICATIONS

This application relies for priority on U.S. Provisional Application No. 60/638,568 of Anthony Kewitsch, filed on Dec. 22, 2004 and entitled "Transmissive Optical Detector".

FIELD OF THE INVENTION

This invention relates to optical systems using detectors to monitor optical illumination and/or signals, and more particularly to detectors which monitor optical illumination without substantially diminishing the strength of the optical illumination.

BACKGROUND OF INVENTION

The need for low cost, compact and reliable optical detectors to perform optical sensing and monitoring is significant in optical communications networks to carry out the self-monitoring and diagnostic functions necessary to maintain quality of service. As the deployment of optical networking systems increases, the maintenance and trouble shooting of such decentralized systems becomes more challenging. To reduce network downtime and the costs associated with maintenance, there is an ever increasing need for optical components and subsystems which incorporate health monitoring functionality. Electronic systems already incorporate built-in monitoring and diagnostic capabilities to prevent catastrophic network failures. However, the realization of optical systems which perform this diagnostic and self-healing functionality requires the development of more compact, economical and more reliable optical detection and monitoring modules.

Costly fiber coupled power monitors have been deployed sparsely in long haul and metro networks to measure optical signal characteristics such as power, signal-to-noise ratio, and wavelength. Occasionally such monitors also receive low bandwidth supervisory data on radio frequency tones at 10 KHz, for example. The typical network monitor includes a tap splitter, either of the fused coupler type or micro-optic type, integrated with a discrete GaAs photodiode responsive to 1550 nm and 1310 nm wavelengths. The complexity of such a device results in significant cost and insertion loss. U.S. patent application Ser. No. 2004/0208442 by Shi et al., for example, describes an optical power monitor design based on a microoptic approach.

To monitor multiple dense wavelength division multiplexed (DWDM) channels within a single fiber, a diffraction grating demultiplexer and GaAs detector array has been the preferred approach. A scanning narrow band optical filter and photodetector may be used for lower performance applications. These monitors typically have response times of 1 to 100 ms.

A further limitation of present receiver technology is the difficulty in achieving a flat photodiode responsivity from dc to 10's of GHz. The response of high speed optical receivers typically exhibits a low frequency roll-off at 30 to 50 KHz due to the practice of applying a dc bias across the junction through an ac coupling circuit. Since some systems encode low frequency supervisory data of 10 to 20 KHz bandwidth, an inexpensive, low bandwidth optical detector to extract this supervisory data is of great value.

While optical detectors used in fiberoptic communication systems are generally restricted to photodiodes made of GaAs, Si and Ge, a wide variety of detector technologies have been developed for the general field of optics (see, for example, Infrared Detectors and Systems, Dereniak and Boreman, Wiley 1996). These detector types include photovoltaic, photoconductive, thermal, Schottky-Barrier photodiodes, multiple quantum well and superlattice detectors. A near universal characteristic of all these detector approaches is the very high optical absorption of the detector material at the wavelength of interest. These detectors operate in a mode wherein all light incident on the detector is absorbed. However, for optical power and signal monitoring applications, only a fraction of the power is available for detection. In these situations, present detector technology is inadequate.

SUMMARY OF THE INVENTION

It is an object of the present invention to provide a transmissive-type thermal detector of optical radiation. In one embodiment, the detector is a bolometer, wherein a thin (typically 50 to 500 Angstroms) transparent conductive coating of low optical absorption (0.5 to 5%) at the wavelengths of interest (e.g., 850 nm, 1310 nm and/or 1550 nm) is deposited on the surface of an optical fiber endface. This conductive coating is patterned by laser ablation, for example, to form a resistive sensor across the light guiding core of the waveguide. The dimensions of the thin film resistor and its overlap with the optical intensity are tailored for the particular application.

The optical intensity at the core of an optical fiber is sufficiently high that a 1% absorption coating produces a temperature increase of 100 to 200° C. for an optical power level of +30 dBm. The temperature increase produces a corresponding increase in the resistivity of the transparent conductor, which can be detected electronically with resolutions exceeding a part per million.

This detector coating may be incorporated into a wide variety of optical devices, such as fiber optic cable terminations (single or multi-fiber), microoptic collimators, integrated waveguide devices, thin film interference devices, optical switches, lasers, and receivers. Individual detectors can be formed on the fiber endface, or multiple detectors can be formed on multi-fiber arrays or glass substrates. These and other objects of the present invention will become apparent to those of ordinary skill in the art after having read the following detailed description of the preferred embodiments illustrated in the various drawings.

BRIEF DESCRIPTION OF THE DRAWINGS

FIG. 9 illustrates in partial cutaway view an array of detectors formed on the enface of a multi-fiber array ferrule;

DETAILED DESCRIPTION OF THE INVENTION

The in-line optical power monitor disclosed in this invention is realized in a particulary compact, low loss and low cost form by incorporating a thermal sensing film within the body of a fiberoptic union adaptor. By combining such an adaptor with an electronic detection circuit, such a component can monitor the optical power at any location along a fiber transmission medium or can provide optical device health monitoring to prevent interruption of service and reduce downtime. These features facilitate debugging and maintenance of optical networks.

Figure 1:
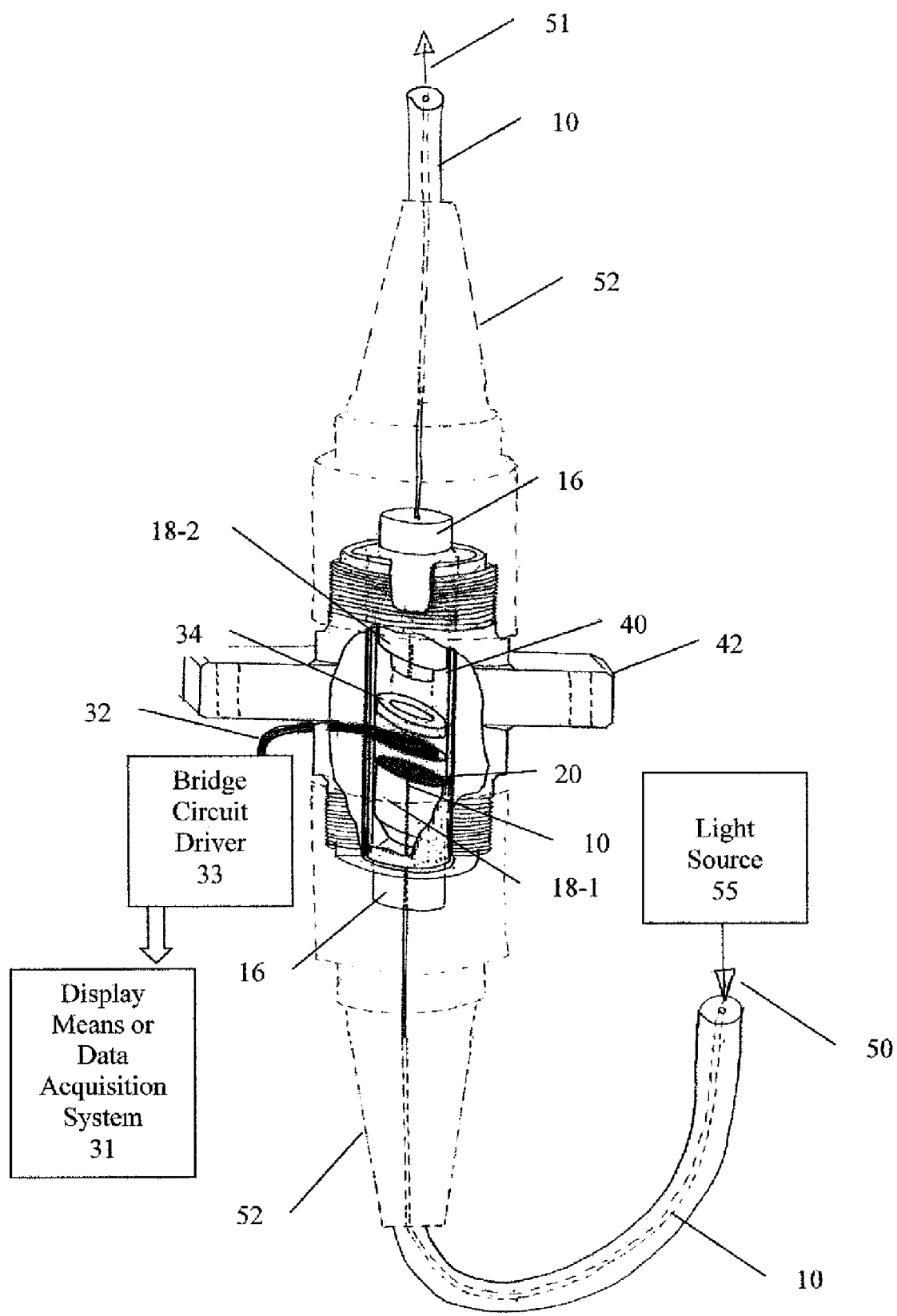
FIG. 1 illustrates an exploded, partial cutaway view of a single channel, in-line fiber optic detector and measurement apparatus utilizing a transparent conductive coating for optical power detection.

A convenient location to monitor transmitted optical power within an optical fiber is at locations within the fiber optic network where two connectorized fiber optic cables are joined in a fiberoptic union adaptor. FIG. 1 illustrates an exploded view of the in-line optical power monitor in which the detector body 42 is cutaway to reveal the optical and electrical elements comprising the detector component.

Two opposite and concentric fiber stubs 18-1 and 18-2 include a transmissive conductive coating on the interface there between. A patterned, transparent conductive coating 20 is deposited and patterned on the planar face of fiber stub 18-1 such that a resistive detector element is defined in precise alignment with the core of optical fiber 10. To achieve electrical continuity between the resistive elements patterned on coating 20 and with the bridge circuit driver electronics 33, a multi-conductor flexicable 32 makes electrical contact with the coating 20 by aligning its exposed conductor segments 32-1 with the corresponding pad-features 20-3. The bridge circuit driver 33 supplies an ac voltage waveform which drives the resistive bridge and measures the output voltage (and potentially the input current) of the resistive bridge. The change in resistance of the detector element can be determined with high precision by circuit 33.

In a preferred embodiment, the housing of the detector is a bulkhead union type adaptor, consisting of a metal or plastic housing 42 containing a precision split sleeve 40 providing passive concentric alignment of the two opposing fiber stubs 18-1, 18-2. The fiber stubs are fixed in location by adhesive bonding, for example. Typical split sleeves are fabricated of phosphor bronze or zirconia ceramic. Typical ferrule and fiber stubs are fabricated of zirconia or fused silica with outer diameters of 2.5 mm or 1.25 mm.

The contact interface between fiber stubs includes the detector coating 20. Note that the inner face of one stub 18-2 includes a cylindrical shoulder and a reduced diameter neck 18-4 for providing access to electrical interconnects contacting the coated face of opposing stub 18-1. The inner face of the coated stub 18-1 is planar. The outer faces of the stubs 18-1 and 18-2 are prepared with a polished surface to mate with standard fiberoptic terminations, such as the physical contact (PC), angled physical contact (APC), or the ultra-physical contact polish (UPC) style. During use, connectorized fiberoptic cables 52 are inserted into opposite ends of the detector, thereby placing the detector in-line with the optical transmission path.

Figure 2:
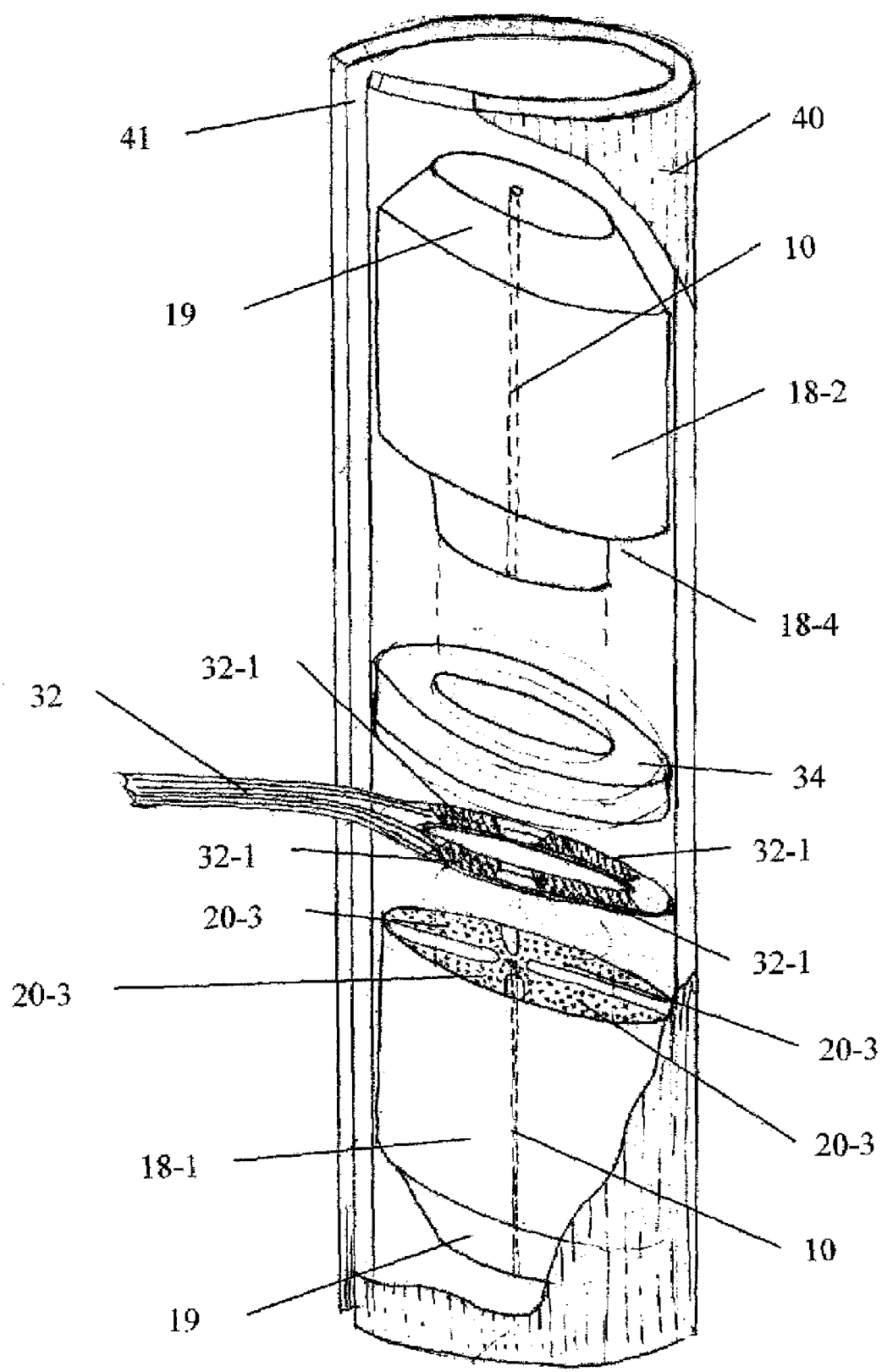
FIG. 2 illustrates an exploded, partial cutaway view detailing the micro-optic elements comprising the in-Ine fiber optic detector.

FIG. 2 presents an exploded cutaway view of the detector subassembly, including fiber stub 18-1 coated with transparent conductive coating 20, flexicable 32, elastomer ring 34 and alignment sleeve 40. The four conductive pads 32-1 of the flexicable are aligned with the corresponding pads 20-3 defined lithographically in the transparent conductive thin film. The flexicable 32 passes through the gap 41 of split sleeve 40 and serves as a flexible conductive member joining the detector element with the external bridge circuit driver 33 (not shown). The elastomer ring 34 produces a force which contacts the flexicable 32 to the conductive pads 20-3. Fiber stubs 18-1, 18-2 are in physical contact with one another and with the flexicable 32 and ring 34. Fiber stubs 18 include a length of optical fiber 10 which is epoxied or soldered into a precise mating channel of the concentric ferrule prior to polishing of its end faces. Optical fiber 10 may be one of various single mode or multimode types. Both ends of the fiber stubs 18-1 and 18-2 are optically polished such that they produce a negligible optical insertion loss when physically contacted. The outer faces of each fiber stub 18 may be prepared with APC terminations 19 to minimize the backreflections of the detector.

Figure 3:
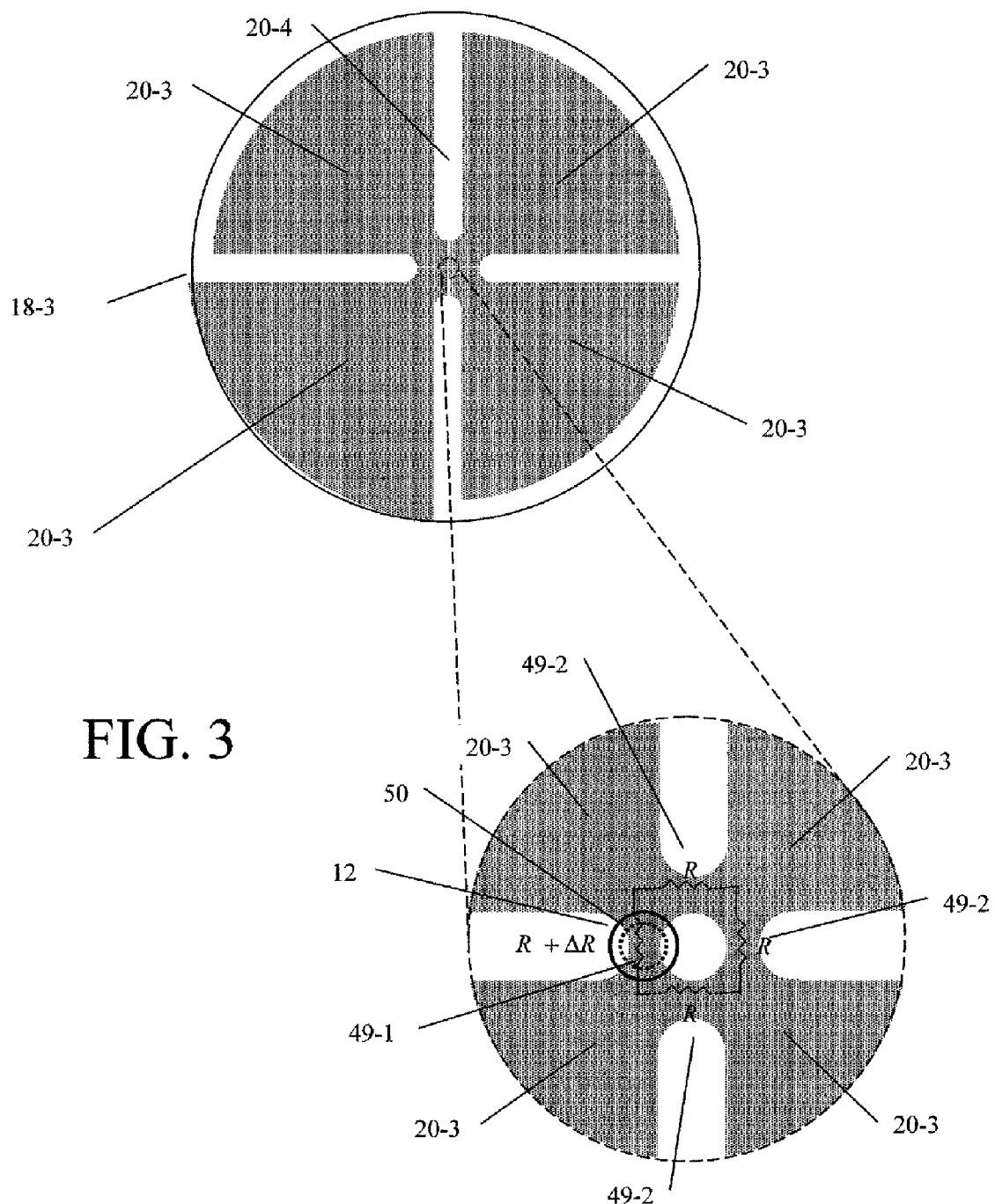
FIG. 3 details the endface of an optical fiber stub on which the transparent conductor coating is patterned to form the transmissive detector.

FIG. 3 is a top view of the polished, planar endface 18-3 of the fiber stub on which a transparent, conductive thin film is deposited and patterned. The thin film is patterned to form four pads 20-3, wherein the conductive coating is removed in regions 20-4 between pads 20-3. The expanded inset of FIG. 3 details the pattern of the conductive thin film in the vicinity of a single mode core 12 with 10 micron nominal diameter. The optical energy localized in optical mode 50 is partially absorbed by coating 20, which causes local heating of resistor sensor element 49-1 to produce a resistance change $\Delta R$. Lumped resistors 49-1 and 49-2 correspond to the conductive coating isthmuses which join isolated contact pads 20-3. The isthmuses comprising a bridge circuit arrangement are of the same nominal dimension with minimum width of about 5 microns. The boundaries of the isthmuses may be defined with radiuses to facilitate lithographic patterning.

Due to the low thermal conductivity of silica and the physical geometry, only a relatively small amount of thermal diffusion occurs outside of the fiber core region 12. Resistors 49-2 outside the illuminated region are therefore at the nominal temperature of the ambient environment, which serves to reduce or eliminate the dependence of the detector response on ambient temperature.

The fiber stub 18 is typically fabricated of fused silica or zirconia ceramic closely matched in thermal expansion to the fused silica optical fiber. The conductive coating is deposited on the planar polished surface of the fiber stub. To eliminate backreflections from this polished interface from being coupled back into the optical fiber core 12, the surface normal to the polished interface is at an angle of 8 degrees relative to the longitudinal axis of the core. This angle is sufficient to direct backreflections outside of the angular acceptable angle of the fiber core (for single mode fiber with numerical aperture of 0.12 the acceptance angle is about 5 degrees). It may further be advantageous that the conductive pad regions 20-3 be overcoated with a chrome-nickel-gold thin film to provide low and stable contact resistance between the transparent conductive coating 20 and the flexicable contact pads 32-1. The typical thickness of such a coating is 500 to 1000 nm. The flexicable may further be soldered directly to the chrome-nickel-gold film.

Fiber stubs, a common subcomponent in fiberoptic transceivers, utilize a thermal epoxy process to bond the optical fiber 10 within the ferrule or body of the stub 18. The typical maximum processing temperature of the fiber stub is 120 degrees Celcius. This demands that the transparent conductive film and chrome-nickel-gold film be deposited on the stub at temperatures below 120 degrees Celcius. A cold-coat sputtering process is a suitable method of depositing a dense and durable coating with excellent adhesion at this relatively low temperature. In a particular example, the transparent conductive coating is deposited by rf sputtering of indium tin oxide (ITO) to a thickness of 10 to 20 nm. The sheet resistivity of such a coating ranges from 100 ohm/sq to 1000 ohm/sq and the optical absorption at 1550 nm wavelengths ranges from 0.5 to 5%. The sheet resistivity of ITO depends on the oxygen content, density and stoichiometry of the deposited film. Since ITO absorbs light throughout the visible and infrared wavelength range, the thermal detector is responsive to a broad range of wavelengths including 850 nm, 1310 nm and 1550 nm.

The sheet resistivity of as-deposited film is nominally constant across the film. The conductive film is subsequently patterned and etched, defining non-conducting narrow channels 20-4. Each detector comprises at least one resistive isthmus bridging this channel whose resistance changes depending on temperature. The dominant contribution to the measured resistance across pads 20-3 comes from these narrow isthmus or junction sections.

This transmissive-type detector achieves high performance in part because it is seamlessly integrated into existing fiberoptic devices and systems. Important performance parameters are insertion loss, return loss, dynamic range and sensitivity. The insertion loss corresponding to the detector's 1% absorption coating is only 0.04 dB, which is negligible compared to the loss of a typical tap coupler and photodetector (~0.5 dB). The polished and aligned fiberoptic terminations typically produce less than 0.1 dB additional loss. The ITO coating between the two fiber stubs produces a slight discontinuity in the complex index of refraction, producing a small back reflection from the coating. To reduce the coupling of this back reflection into the fiber core, the fiber endface is polished at an angle of greater than or equal to 5 degrees, typically 8 degrees. This maintains the return loss at above 50 dB.

Figure 4:
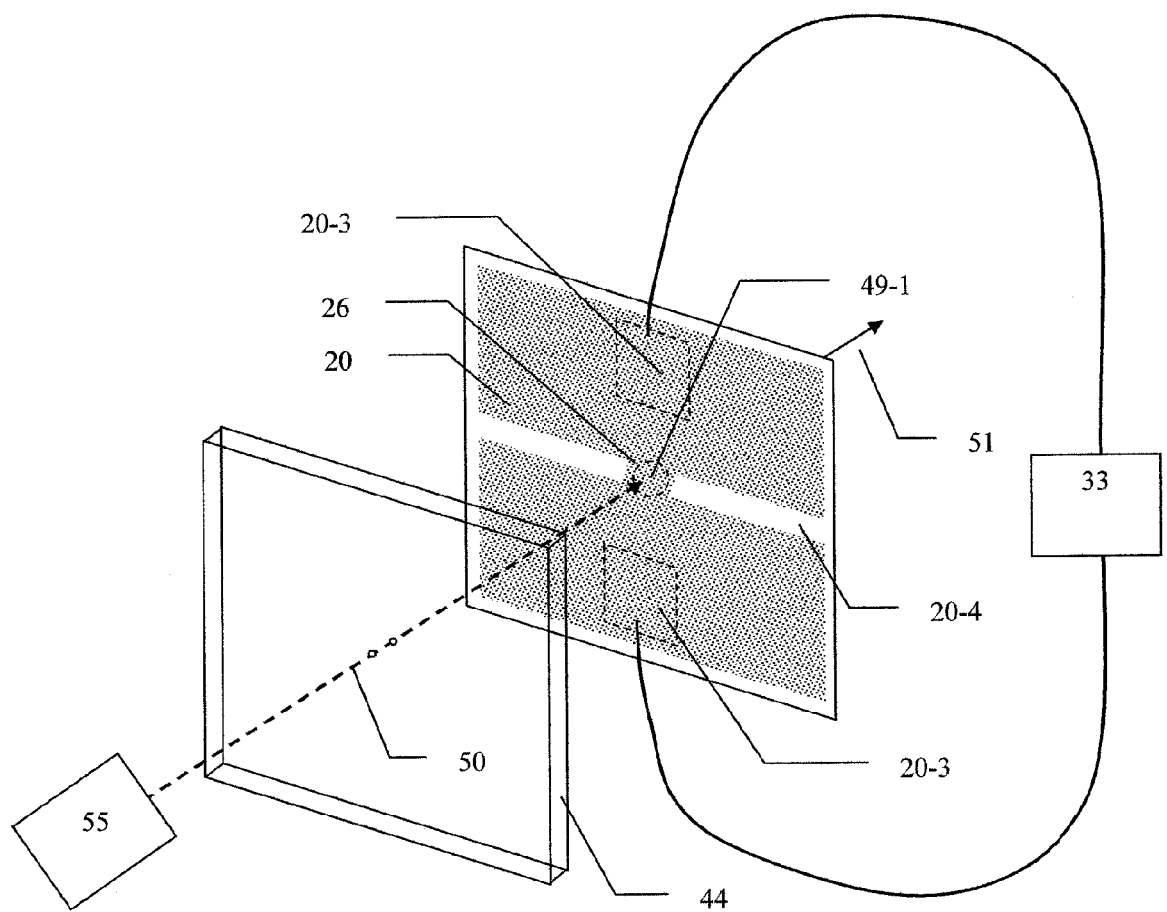
FIG. 4 depicts schematically the layers comprising a transmissive optical detector formed on a transparent substrate.

FIG. 4 is a schematic representation of a generic transmissive optical detector utilizing a transparent conductive coating 20 deposited and patterned on a transparent substrate 44 through which an optical input beam 50 is transmitted. Such a detector can be used to detect guided or unguided optical waves. The coating 20 is removed in regions 20-4 to leave a conductive isthmus 26 defining resistor element 49-1 which substantially intersects the input optical beam 50. The optical input beam 50 is transmitted through the substrate 44 and coating 20, and exits at output beam location 51 with substantially the same optical power. The optical beam produces a localized temperature change at location 26 proportional to the absorbed optical energy or intensity, which effects a change in resistance of element 49-1 proportional to the change in temperature. This electrical response is detected across electrical contact pads 20-3 by an electronic circuit 33, which may be an ohmmeter, for example. Note that the detector response is bi-directional; that is, the detector response is independent of the direction of propagation through the coating 20, and the detector response is polarization independent; that is, the detector response is independent of the direction of polarization for transverse electromagnetic radiation substantially normally incident on coating 20.

The transparent substrate 44 can be any of a wide variety of optical materials and components, including but not limited to glass windows, lenses or endfaces of optical fibers. For example, if the subtrate is a polished or cleaved optical fiber endface, the active detector element should overlap with the fiber core. The typical single mode fiber core diameter for 1550 and 1310 nm transmission is 10 µm. In one example, the sensor element formed at the core is nominally 5 µm wide and 10 µm long. Outside of the light guiding region, the ITO conductor width expands dramatically such that the region of the conductor outside of the illumination makes a relatively small contribution to the total resistance of the detector. As the width of the sensor element is reduced, the resistance of the sensor element increases. As a result, a larger fraction of the measured resistance across pads 20-3 arises from the sensor element, thus enhancing the optical sensitivity of the detector.

Figure 5:
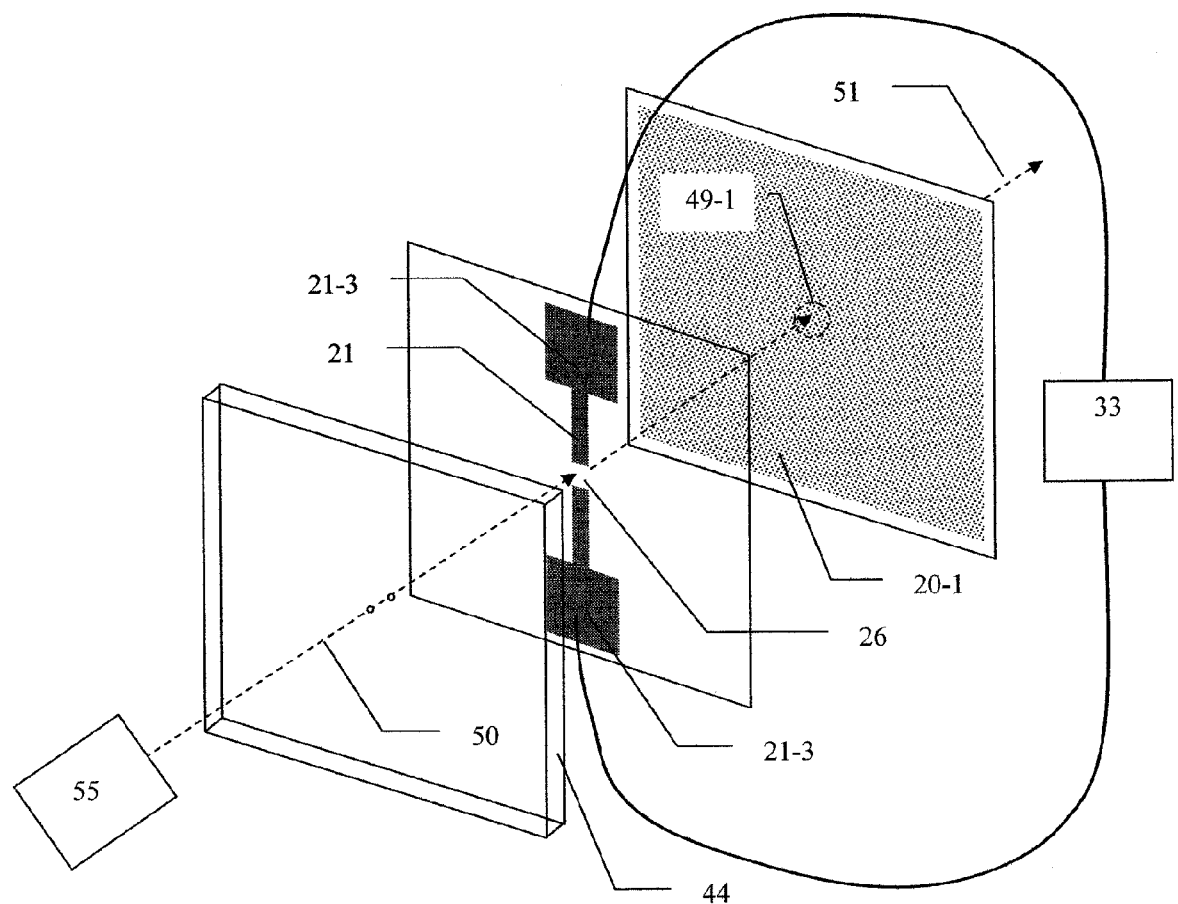
FIG. 5 depicts schematically the layers comprising an alternate transmissive optical detector formed on a transparent substrate.

FIG. 5 illustrates an alternate transmissive optical detector utilizing a low resistivity conductive coating 21 (not necessarily transparent) and a high resistivity transparent conductive coating 20-1 deposited and patterned on a transparent substrate 44. The low resistivity coating 21 is patterned such that the coating is absent at the location of the thin conductive isthmus 26 between contact pads 21-3. The high resistivity coating 20 in contact with coating 21 overlaps the optical beam 50, contacts the low resistivity coating 21 such that the circuit is completed through the high resistivity coating isthmus at 26. The resistance measured across pads 21-3 by circuit 33 is then dominated by the resistance of the coating in region 26. Coating 20 partially absorbs the input optical beam 50 such that the output beam 51 has substantially the same optical power as the input optical beam. The absorbed optical power contributes to local heating in region 26, which changes the sheet resistivity of coating 20 in region 26. The resulting change in net resistance can be measured across pads 21-3 by an ohmmeter or bridge type circuit 33, for example.

In a particular embodiment, the high resistivity coating 20 is indium tin oxide of 5 to 50 nm thickness, and the low resistivity coating 21 is a metallic film of chrome/nickel/gold of 50 to 1000 nm thickness. The high resistivity coating 20 absorbs 1 to 10% of the input optical beam 50 such that 90-99% of the optical power transmitted through the optical system. Alternately, the low resistivity coating 21 can also be a transparent conductive coating such as ITO. To reduce the resistivity of coating 21 below that of 20, a thicker ITO coating may be utilized.

A laser writing system (based on a frequency tripled Nd:YAG laser emitting at 353 nm or excimer laser at 193, 248 or 351 nm, for example) with sufficient intensity to ablate the transparent conductive coating (e.g., ITO) is used to pattern the resistive elements. The patterning can be performed by mask exposure or direct laser writing. In the preferred embodiment the polished fiber endface will be planar and slightly angled relative to the longitudinal fiber axis to maximize optical return loss. In general, the detector substrate may have curvature (e.g. lens) or surface topology (e.g. phase plate). The depth of focus of the exposure system must then be adequate to maintain the pattern fidelity across a variable height surface. The depth-of-focus of the writing beam is related to the Rayleigh range $z_o$:

$$z_o = \frac{\pi \omega_o^2 n}{\lambda} \quad (1)$$

where $\omega_0$ is the radius of the beam at wavelength $\lambda$. For a 10 μm diameter writing beam at 353 nm the depth of focus is 222 μm. For the production of fine features of <10 μm on a curved substrate, the writing process may be divided into two stages, wherein a tightly focused beam is used for precision writing and a loosely focused beam is used for coarse patterning, or the writing process may require active refocusing to follow the contours of a potentially non-planar substrate.

In accordance with this invention, various thermo-electric mechanisms are able in principle to convert the temperature rise from optical heating of this transmissive-type thermal detector into a usable electrical signal. The bolometer approach described above results in a change in resistance of the sensing element as absorbed optical power produces local and intense heating. This element may be a metal, semiconductor, superconductor or thermister. Bulk metals typically exhibit a linear increase of resistance with temperature, a semiconductor exhibits an exponential decrease with temperature, and a superconductor exhibits a phase transition temperature.

A fundamental characteristic of this detector approach is the use of a substantially transparent resistive element whose temperature changes when optical power is absorbed. Based on COSMOS™ finite element modeling, the temperature increase $\Delta T$ at the center of a fused silica fiber is 200° C. for 10 mW absorbed power within a 10×10 μm area and the thermal relaxation time τ is 100 μsec. The response time of the thermal detector is related to geometry dependent thermal parameters C and G:

$$\tau = \frac{C}{G}, \quad (2)$$

where C is the heat capacity and G is the thermal conductivity. By decreasing the heat capacity of the bolometer (shrinking it) or by increasing the thermal conductivity, response time can be decreased. In addition, the temperature increase is given by:

$$\Delta T = \frac{P}{G}. \quad (3)$$

From simulation results and equations (2) and (3), the heat capacity and conductivity for absorbed optical power Parc summarized in Table 1 for a range of detector geometries patterned on a fused silica substrate.

TABLE 1

| Dimension (μm) | C (J K$^{-1}$) | G (W K$^{-1}$) | ΔT (K) for 1 mW/sq micron | τ (μsec) |
|---|---|---|---|---|
| 1 × 1 | 6.58 10$^{-12}$ | 6.58 10$^{-6}$ | 175 | 1 |
| 1 × 10 | 2.22 10$^{-10}$ | 2.22 10$^{-5}$ |  | 10 |
| 10 × 10 | 5 10$^{-9}$ | 5 10$^{-5}$ | 180 | 100 |

Bridge Circuit

Figure 6A:
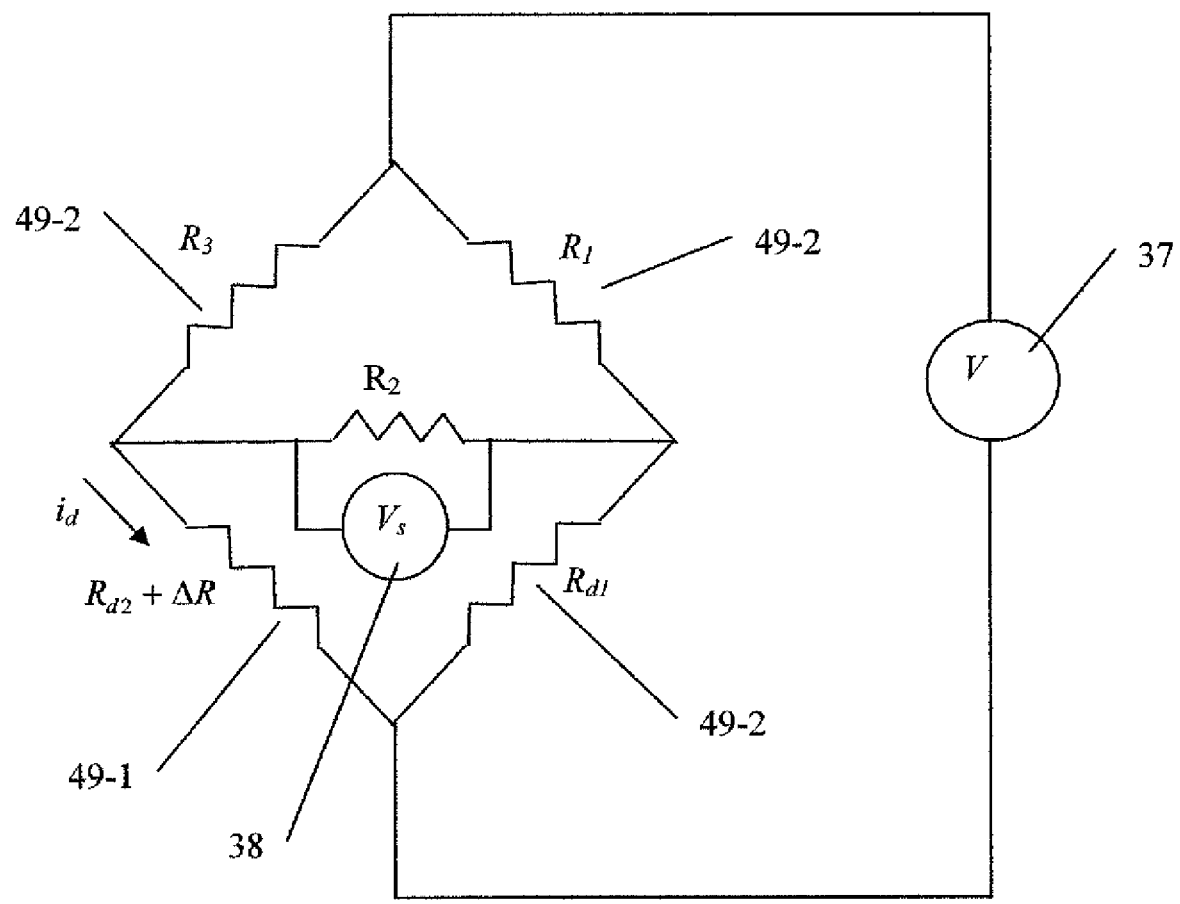
FIGS. 6A-B are circuit diagrams of the thermal detector element as part of (6A) a generic bridge circuit and (6B) a drift compensated bridge circuit.

An example of the external circuit to detect small resistance changes associated with the thermal sensor element is illustrated in FIG. 6A. The resistance of thermal sensor element 49-1 changes depending on the absorbed optical power. Reference resistor elements 49-2 complete the bridge configuration. Elements 49-1 and 49-2 can be fabricated with identical geometries by patterning all four elements in the transparent conductive layer. In an alternate approach, one or more elements 49-2 can also be fabricated using discrete resistors. In either case, the bridge is excited by a voltage source 37 and a voltage signal Vs is measured by voltmeter 38 with input impedance $R_2$. In the preferred embodiment, all resistors 49 are matched to provide the same nominal resistance.

A precise detection circuit is implemented by utilizing a phase-locked loop (PLL) integrated circuit 401, such as the Analog Devices Inc. model 630 balanced modulator/demodulator, with an ac excitation voltage source 37. The PLL extracts the amplitude of the sinusoidal voltage signal produced at the output of the bridge circuit under slight departures from balance. This bridge output voltage is scaled and input to an analog-to-digital converter (ADC) for display or analysis. Alternately, an output proportional to the optical power through the transmissive sensor can be provided via a digital or analog voltage, for example.

Figure 6B:
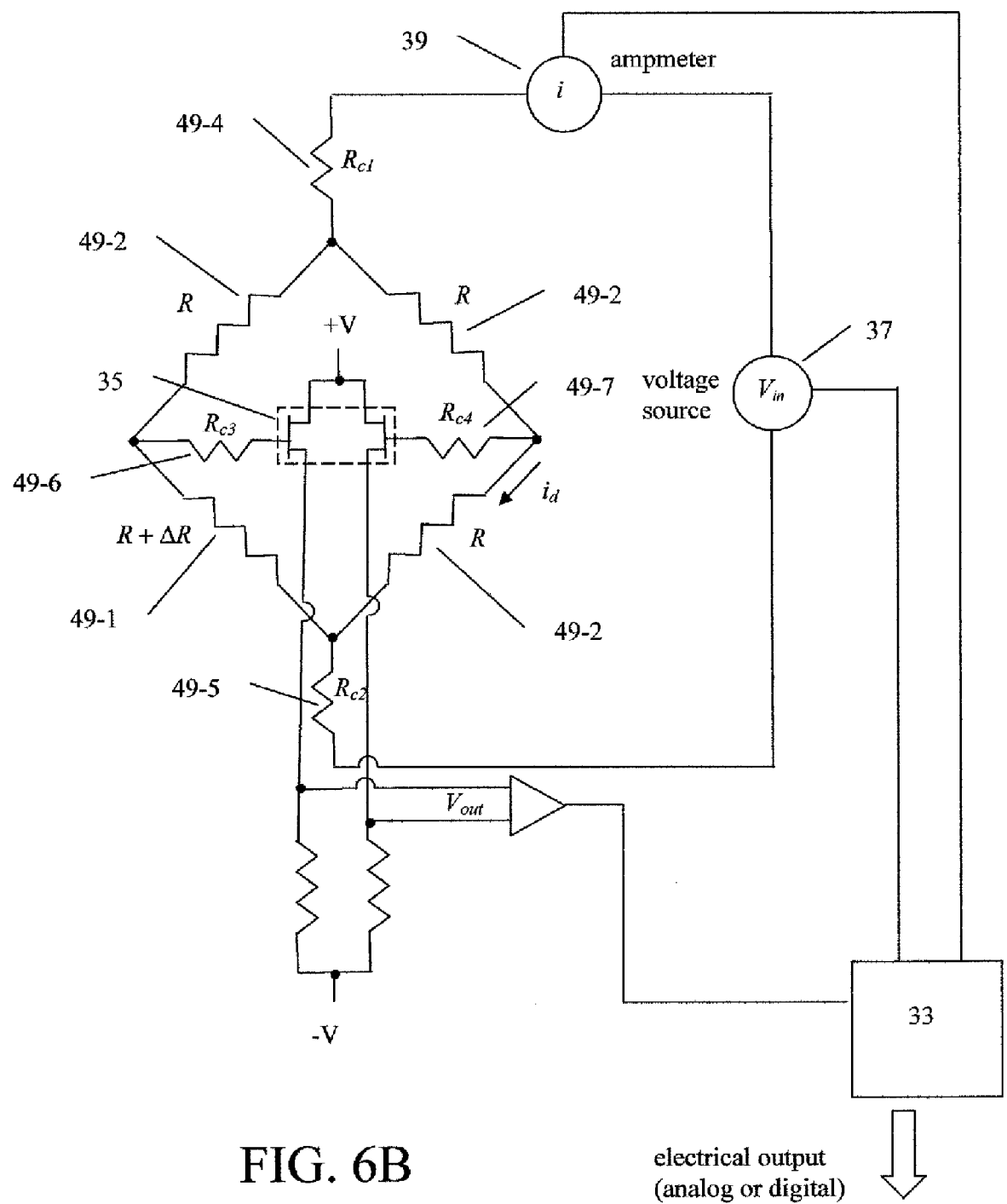

A balanced bridge circuit configuration is effective at measuring small changes in resistivity 49-1. Estimates of the detector power responsivity and noise characteristics can be obtained by analysis of the complete measurement circuit. FIG. 6-A is a diagram of the generic bridge circuit used to sense the resistance change ΔR of the detector. By solving for the bridge voltage $V_S$ as a function of the bias voltage V and the change in detector resistance ΔR (making no assumptions regarding balance):

$$V_s = \frac{V}{\left[\frac{R_3 + R_{d2} + \Delta R}{R_{eq}} + \frac{R_3}{R_2}\right]}, \quad (5)$$

where $$R_{eq} \equiv \frac{R_1 R_2 R_{d2} + R_1 R_2 \Delta R - R_2 R_3 R_{d1}}{R_1 R_{d1} + R_1 R_2 + R_2 R_{d1} + R_3 R_{d1}}. \quad (6)$$

In many practical implementations, the bridge output is connected directly to a source follower transistor pair 35 of typically 10$^{12}$Ω input impedance, as illustrated in FIG. 6-B. In this case, $R_2$ is essentially infinite in equations (5), (6). Furthermore, when the condition $$\frac{R_1}{R_{d1}} = \frac{R_3}{R_{d2}} \qquad (7)$$

is satisfied, the bridge is balanced. In this state, with ΔR equal zero, the equivalent resistance $R_{eq}$=0. The voltage across the detector is then given by:

$$v_d = \frac{V}{1 + \frac{R_3}{R_2}\left(\frac{R_2 + R_{eq}}{R_{d2} + \Delta R}\right)}, \qquad (8)$$

and the current flow through the detector is given by:

$$i_d = \frac{V}{R_3 + R_{d2} + \Delta R + R_{eq} + R_3/R_{d2}}. \qquad (9)$$

This current/voltage bias across the detector causes the temperature of the detector to increase due to Joule heating. The bias is applied to the detector by the bridge circuit to enable a voltage measurement proportional to the change in resistance of the detector. The electrical power dissipation in the detector element produces Joule heating. It has been shown that this Joule heating term will increase the responsivity for bolometers with a positive temperature coefficient of resistance (such as metals) because as the detector heats up by absorbing light, the resistance increases. This bias produces an increase in electrical power dissipation and heating, which contributes a further increase in resistance. The responsivity enhancement in ΔR for a given amount of absorbed radiation benefits from a large bias voltage V, a large temperature coefficient of resistivity α, and small detector resistance $R_d$.

The accuracy and resolution of bridge circuits such as that illustrated in FIG. 6-A, using a dc excitation source 37, are practically limited by 1/f noise, dc drifts in the electronics and line noise pick-up. These effect are reduced by exciting the bridge with an ac waveform, amplifying the bridge output with an ac amplifier, and synchronously demodulating the resulting signal (see T. Wilbanks et al., IEEE Transactions on Nuclear Science, Vol. 37, No. 2 (1990), pp. 566-572). The ac phase and amplitude are recovered as a dc signal at the output of the synchronous demodulator. The phase-locked loop (PLL) mixes noise contributions to the carrier frequency so that subsequent noise can be removed by an electronic band pass filter.

The detector bridge is biased with an ac voltage 37 whose frequency is chosen sufficiently high that the Joule heating of the bolometers is effectively constant. This is accomplished with either a square wave with high slew rate or sinusoid of frequency much greater than the inverse thermal relaxation time. For a voltage bridge, the Joule heating of the detector is maintained at less than or equal to 1 mW when the resistances of the detectors $R_{d2}$, $R_{d1}$ are less than 2.0 KΩ for a bias voltage of less than 1.4 volts rms. For a current bridge, Joule heating is reduced by lowering the detector resistance. To maintain less than 1 mW of Joule heating when the resistance of the detectors $R_{d2}$, $R_{d1}$ is equal to 2.0 KΩ, the bias current should be less than 0.7 mA rms. To further reduce the Joule heating, the voltage or current may be pulsed such that the average voltage or current is reduced.

Mismatch of the active 49-1 and reference 49-2, 49-3, 49-4 detectors compromise the circuit's noise suppression. Additionally, the thermal response of the bridge elements 49 should be matched so that all resistor elements track the change in background temperature identically. The patterned ITO resistors 49, for example, should have a relative difference in resistance of <10%, requiring that the aspect ratio of the resistive elements (length/width) vary by <10%.

The measurement of small changes ΔR in the resistance of the detector 49-1 requires stable, low impedance electrical interconnects between the detection circuit and bolometer elements. These additional resistances are labeled $R_{c1}$, $R_{c2}$, $R_{c3}$, $R_{c4}$ in FIG. 6-B. Suitable low resistivity, gold-type conductive elastomer type connectors used for pcb-pcb and LCD-pcb interconnects are available with 10 mΩ per 0.4 mm$^2$ contact area. Suitable interconnects and flexicables are available from Tyco Electronics and Fujipoly USA, for example. The change of contact resistance over the lifetime of the device is estimated to be less than 2.5 mΩ. In one embodiment, the maximum optical power produces a resistance change of >150Ω. Therefore, a 2.5 mΩ change out of 150Ω gives a dynamic range of >48 dB. This inherent dynamic range should be preserved by proper selection of the dynamic range of the digital-analog converter (DAC). Assuming a single gain setting, a 14 bit DAC corresponds to a 42 dB dynamic range, and a 16 bit DAC corresponds to a 48 dB dynamic range.

For high precision power measurements, any long term drift in the resistivity of the contacts between the external circuit and the ITO detector should be nulled out of the optical power measurement. In typical implementations of bridge circuits, only the voltage $V_s$ is measured to give the estimate of ΔR according to equations 5 and 6. However, as illustrated in FIG. 6-B, in practice the bridge circuit may include additional contact resistances $R_{c1}$, $R_{c2}$, $R_{c3}$, $R_{c4}$ resulting from the physical interconnects between the transparent conductive coating and the external detection circuitry. The error in resolving ΔR due to resistances $R_{c3}$, $R_{c4}$ can be made negligible by utilizing a high input impedance transitor circuit 35 to measure the voltage $V_s$ across the bridge. The input impedance of the transitors is several orders of magnitude larger than the potential contact resistances $R_{c3}$, $R_{c4}$. The large input impedance limits the current into the transitor circuit 35 and essentially eliminates the voltage drops across $R_{c3}$, $R_{c4}$. On the other hand, changes in the contact resistances $R_{c1}$, $R_{c2}$ may cause errors in the measurement of ΔR because these contact resistances may not be negligible compared to the change in resistance measured in the bridge circuit.

This effect can be compensated by measuring not only $V_s$ but also the current i into the resistive bridge, as shown in FIG. 6-B. For simplicity, assume the bridge is nominally balanced with each resistance equal to R, and the detector producing a resistance change ΔR. The voltage across the bridge is reduced due to the contact resistances $R_{c1}$ and $R_{c2}$:

$$V_{bridge} = \frac{R_{bridge}}{R_{bridge} + R_{c1} + R_{c2}} V_{in}, \qquad (10)$$

where $$R_{bridge} = \frac{2R(2R + \Delta R)}{4R + \Delta R}. \quad (11)$$

The output voltage of the bridge $V_s$ is given by:

$$V_s = \frac{\Delta R}{2(2R + \Delta R)} \frac{R_{bridge}}{(R_{bridge} + R_{c1} + R_{c2})} V_{in} \quad (12)$$

and $$i = \frac{V_{in}}{R_{c1} + R_{c2} + R_{bridge}}. \quad (13)$$

Solving equations (10)-(13) for $\Delta R$ and eliminating variables $R_{c1}$ and $R_{c2}$ leads to the final result:

$$\Delta R = \frac{4RV_s}{iR - V_s}. \quad (14)$$

Therefore, the measurement of the current i as well as the output voltage $V_s$ nulls out potential drifts in contact resistance during long term aging of the detector. In FIG. 6-B the current is measured by ammeter 39 and the voltage and current values are processed by the bridge circuit electronics 33.

Detector Frequency Response

The frequency response of this transmissive-type bolometer is derived from the heat flow equation:

$$C\frac{d\Delta T'}{dt} + G\Delta T' = \varepsilon\Delta\phi' + P_{elec}, \quad (15)$$

where heat transfer due to blackbody radiation has been shown to be negligible under typical operating conditions. To determine the frequency response of the thermal detector, the optical power, temperature change and resistance change are Fourier decomposed according to:

$$\Delta T = \Delta T + \Delta T_0 e^{iwt} + c.c., \quad (16)$$

$$\Delta R = \Delta R_0 + \Delta R e^{iwt} + c.c., \quad (17)$$

$$\Delta\phi = \Delta\phi_0 + \Delta\phi e^{iwt} + c.c. \quad (18)$$

Substituting equations (16), (17), (18) into equation (15) and separating into steady state and time varying components leads to:

$$G\Delta T_o = \varepsilon\Delta\phi_o + \frac{v_{do}^2}{R_{d2}} + \frac{\partial P_{elec}}{\partial \Delta R}\bigg|_{\Delta R=0} \Delta R_o \text{ and} \quad (19)$$

$$\Delta T \sqrt{\omega^2 C^2 + G^2} = \varepsilon\Delta\phi + \frac{\partial P_{elec}}{\partial \Delta R}\bigg|_{\Delta R=0} \Delta R. \quad (20)$$

Equation (19) is used to estimate the steady state temperature increase of the detector element, and equation (20) is used to estimate the frequency response of the detector. In equation (19), the voltage $V_{do}$ across the detector can be equivalently expressed in terms of the bridge bias voltage V and the detector resistance change $\Delta R$. The second term on the right side of equation (19) corresponds to the bias heating of the detector. The temperature change $\Delta T$ is defined in terms of the resistance change $\Delta R$, assuming a linear change in resistance $R_{b2}$ with temperature, according to:

$$\Delta T \equiv \frac{1}{\alpha}\frac{\Delta R}{R_{d2}}, \quad (21)$$

where $\alpha$ is the temperature coefficient of resistance. Substituting equation (21) into (20) and solving for $\Delta R$ gives the change in $R_{d2}$ for absorbed optical power $\Delta\phi$:

$$\Delta R = \frac{\varepsilon\alpha\Delta\phi R_{d2}}{G\sqrt{(1+\omega^2\tau^2)} - \alpha R_{d2}\frac{\partial P_{elec}}{\partial \Delta R}\bigg|_{\Delta R=0}}. \quad (22)$$

The second term in the denominator of equation (22) represents the enhancement in responsivity due to bias induced self-heating of the detector element. The temperature coefficient of resistance of the transparent conductor can be either positive (bulk material) or negative, depending on the microstructure of the coating. ITO has a relatively small $\alpha$ in absolute value and resistance $R_{d2}$, so this enhancement term is typically much smaller than the first term in the denominator of equation (22). The small signal frequency response of the detector bridge circuit, in volts per Watt absorbed by the bolometer is:

$$R_{bridge} = \frac{\partial v_s}{\partial \phi}\bigg|_{\Delta\phi=0}. \quad (23)$$

This responsivity is obtained by differentiating $V_s$ given by equation (5) and evaluating at $\Delta\phi=0$:

$$R_{bridge} = \frac{V \cdot R_2}{(R_3 R_2 + R_{d2} R_2 + R_3 R_{eqo})^2}[R_2 R_{eqo} - \gamma R_3 R_2 - \gamma R_{d2} R_2] \quad (24)$$

$$\frac{\Delta R}{\Delta\phi}\bigg|_{balanced\ bridge}^{R_2=\infty} \approx -\frac{V}{R_{d2}}\frac{\Delta R}{\Delta\phi}.$$

TABLE 2

Parameters Used in Calculations

| Parameter: | Value: |
|---|---|
| Emissivity (Fused Silica) $\varepsilon$ | 0.75 |
| Temperature Coefficient of Resistance (ITO) $\alpha$ | 0.00075 $K^{-1}$ to 0.0018 $K^{-1}$ |
| Detector Surface Area $A_d$ | $10^{-11}$ |
| Thermal Detector Resistance $R_{d2}$ | 1000 $\Omega$ |
| Thermal Reference Resistance $R_{d1}$ | 1000 $\Omega$ |
| Bridge Resistance $R_1$ | 1000 $\Omega$ |
| Bridge Amplifier Input Impedance $R_2$ | $10^6$ $\Omega$ |
| Bridge Resistance $R_3$ | 1000 $\Omega$ |

TABLE 2-continued

Parameters Used in Calculations

| Parameter: | Value: |
|---|---|
| 1/f Noise Coefficient | $10^{-12}$ |
| Electrical Bandwidth $\Delta f$ | 1 Hz |

The estimated responsivity of the thermal detector as a function of frequency is evaluated using the parameters given in Tables 1 and 2. The −3 dB bandwidth of the detector increases from 2 KHz to 200 KHz as the detector area decreases. The responsivity of the bridge circuit increases linearly as the voltage input $V_{in}$ increases and the bandwidth is relatively independent of bias voltage.

Detector Noise Characteristics

The dynamic range of the detector is ultimately limited by the noise floor of the detector. The primary noise sources of this detector are 1/f, Johnson and thermal or phonon noise. The 1/f noise voltage across the thermal detector is given by:

$$\Delta v_{d,1/f} \sim \eta i_d R_{d2} \left(\frac{\Delta f}{fA_d}\right)^{1/2},$$

where $\eta$ is a phenomenological constant and $A_d$ is the detector area. From equation (9) derived for the bridge circuit, the current through the detector is written in terms of the bias voltage and resistance and is evaluated for no illumination ($\Delta \phi = 0$) so that the spectral density function for voltage fluctuations is:

$$\Delta v_{d,1/f} \sim \eta R_{d2} \left(\frac{\Delta f}{fA_d}\right)^{1/2} \frac{V}{R_3 + R_{d2} + R_{eqo} R_3/R_{d2}} \overset{R_2 = \infty,}{\underset{balanced\ bridge}{\approx}} \quad (26)$$

$$\eta R_{d2} \left(\frac{\Delta f}{fA_d}\right)^{1/2} \frac{V}{2R_{d2}}.$$

This corresponds to a noise equivalent optical power (NEP) for 1/f noise of:

$$NEP_{1/f} = \frac{\Delta v_{d1/f}}{\Re_{detector}}. \quad (27)$$

The equivalent spectral density function at the output of the bridge circuit is calculated from:

$$\Delta v_{s,1/f} = \Re_{bridge} NEP_{1/f} \quad (28)$$

1/f noise is typically determined empirically and is caused by space charge fields or defects which screen the electrodes, for example.

Johnson noise is a fundamental characteristic of a resistor at a non-zero temperature. The Johnson noise across the detector is independent of frequency but depends on the resistance of the bolometer element and on its temperature according to:

$$\Delta v_{d,j} = \sqrt{4kTR_{d2}\Delta f}, \quad (29)$$

corresponding to a noise equivalent power of:

$$NEP_j = \frac{v_{d,j}}{\Re_{detector}}. \quad (30)$$

Alternately, the spectral density function at the output of the bridge circuit is:

$$\Delta v_{s,j} = \Re_{bridge} NEP_j. \quad (31)$$

A third source of noise is related to the intrinsic temperature fluctuations of an object in contact with a heat bath. This thermal noise is proportional to temperature and thermal conductivity. An increase in thermal conductivity more strongly couples the bolometer element to its thermal surroundings and this coupling enhances the noise. The noise equivalent power for thermal noise is given by:

$$NEP_t = \sqrt{4k_B T^2 G \Delta f}. \quad (32)$$

The corresponding detector voltage spectral density function is:

$$\Delta v_{d,t} = \Re_{detector} NEP_t \quad (33)$$

and the spectral density function at the output of the bridge circuit is:

$$\Delta v_{s,t} = \Re_{bridge} NEP_t. \quad (34)$$

Figure 7:
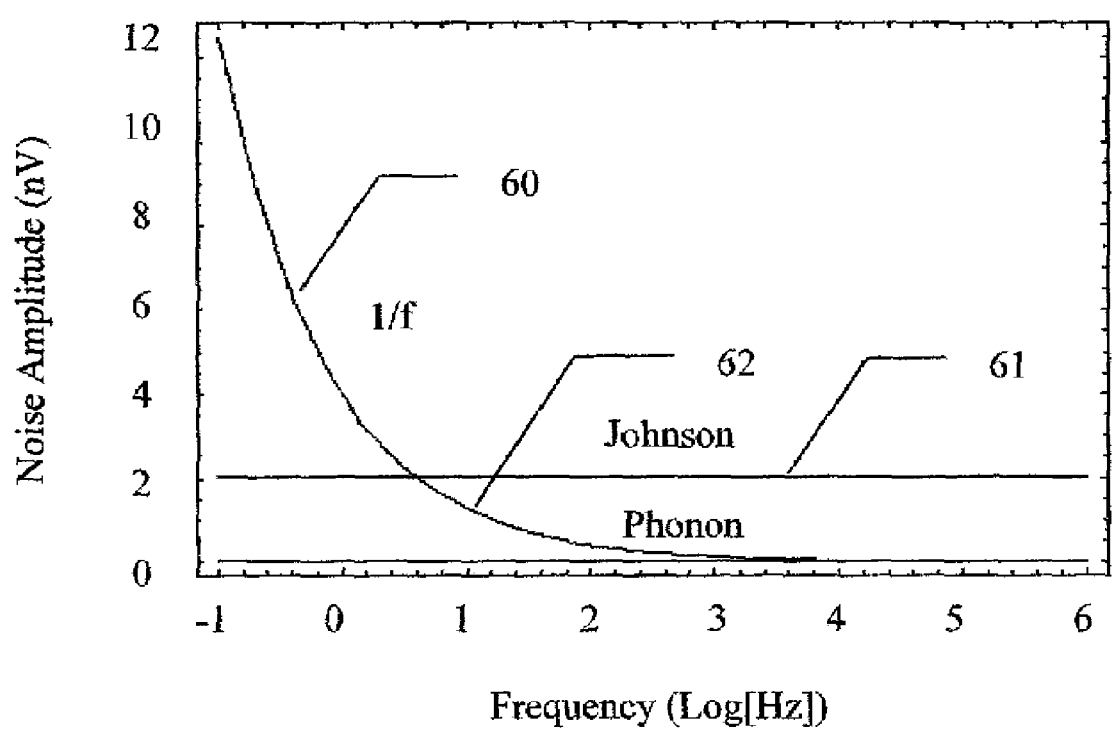
FIG. 7 is a plot of the detector voltage noise characteristic.
Figure 8:
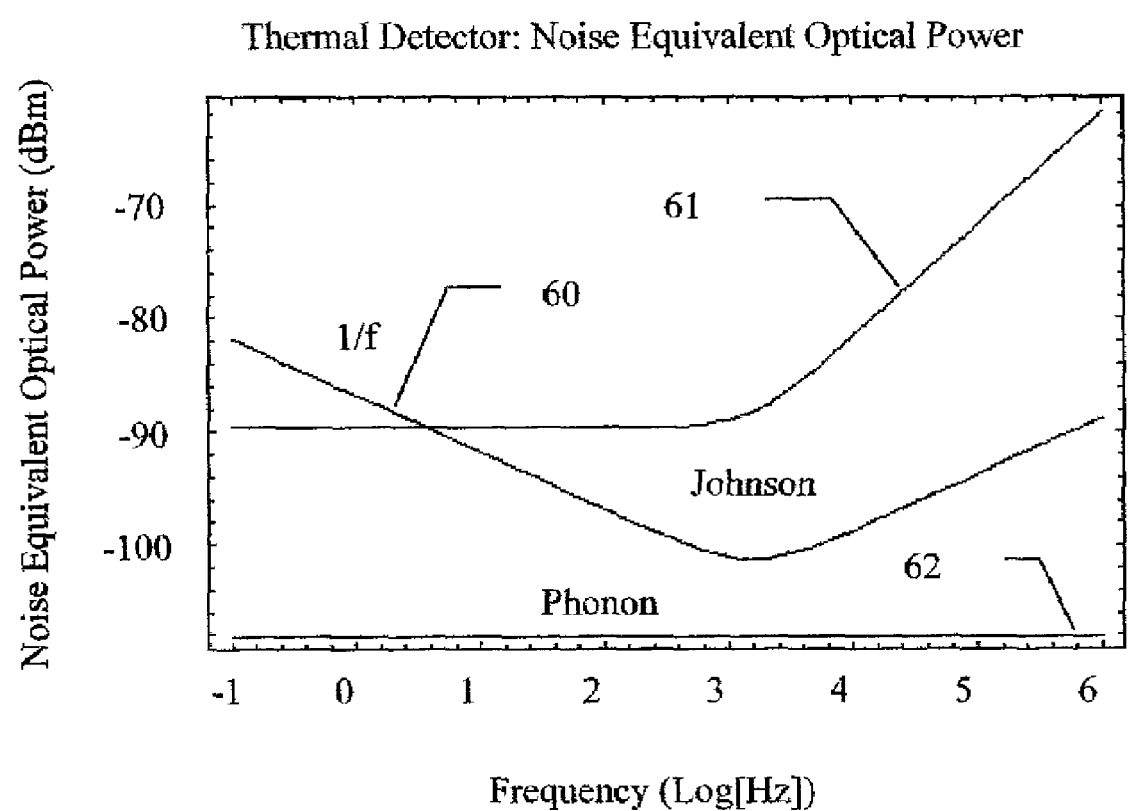
FIG. 8 is a plot of the noise equivalent power of the thermal detector.

For a typical detector geometry (10 by 10 μm), the spectral density functions for 1/f 60, Johnson 61 and thermal/phonon 62 noise are illustrated in FIG. 7. The detector is Johnson noise limited to −90 dBm/$\sqrt{Hz}$ over much of the frequency range. For a 10 KHz bandwidth, the noise floor is −70 dBm, or 0.1 nW. For a 1% effective coating absorption, 10 nW can be detected with a signal to noise ratio of 1. The phonon noise contribution would decrease for smaller detectors since the effective thermal conductivity decreases, while the 1/f noise would decrease for larger detectors. The corresponding NEP's for 1/f 60, Johnson 61 and thermal/phonon 62 noise do show a strong dependence on geometry because of the detector's frequency dependent responsivity, as illustrated in FIG. 8.

Detector Sensitivity

Optical transceivers for DWDM systems, such as those supplied by JDSU Inc. and Agilent Inc., typically accept signal levels as low as −19 dBm for PIN detectors and −29 dBm for APD detectors. A relatively high power laser transmitter launches −1 to +15 dBm optical power, depending on the network application (e.g., long haul or short reach). These systems may transmit hundreds of channels which are optically amplified, producing total powers in a single mode fiber as high as +30 dBm. Short reach transceivers for Ethernet and Fiber-Channel applications typically launch only −4 to −10 dBm at the transmit end. They incorporate PIN detectors and have a receiver sensitivity of −15 dBm at 1 Gbps up to −12 dBm at 4 Gbps. Multichannel DWDM optical channel monitors such as the type offered by JDSU have an input power range of −40 dBm to −10 dBm.

The sensitivity and saturation power level of the thermal detector disclosed herein is tailored to the specific requirement by appropriate design of the optical absorption, resistivity and detector size. A 10 by 10 μm detector element centered on the optical fiber core would exhibit nearly complete overlap with the optical mode and absorb power uniformly across the beam. An optical absorption is 1% corresponds to a loss in transmission of only 0.04 dB. For monitoring applications after an optical amplifier, for example, the power range of interest is +30 dBm to −20 dBm. The maximum power absorbed by the detector is 10 mW, corresponding to a temperature increase of approximately 200° C. To resolve temperature changes with a 50 dB dynamic range requires a temperature resolution of 0.002° C. For a particular ITO coating of temperature coefficient of resistivity equal to 0.00180/° C., this translates to a resistance change of 3.6 mΩ for a 2000Ω detector in a balanced bridge. A 1 ppm resolution of resistance change is possible for a bolometer in a bridge circuit configuration. Performance estimates for a range of detector geometries on a single mode fiber endface with core diameter of 10 µm are summarized in Table 3.

The first column of Table 3 lists the overlap efficiency of the detector isthmus with the optical mode. Clearly, larger detectors have greater overlap; however, as column 8 illustrates, the thermal response time increases for larger detectors. The performance of the optical detector can be further optimized by adjusting the absorption of the detector coating between 1 and 20%, as shown in column 2. The absorption loss in column 3 is the product of the coating overlap and absorption in column 2. For those designs in which the overlap is relatively small, there will be an additional source of loss due to diffraction from the edges of the detector coating. These losses increase for more absorptive coatings and for smaller overlap, as summarized in column 4. These design parameters are calculated for both 100 mW and 1000 mW total powers, as listed in column 5, along with the corresponding amount of absorbed optical power. These absorbed powers produce a temperature increase as listed in column 6. This temperature increase is highly localized at the center of the optical fiber core at the plane of the absorbing coating. The second to the last column provides the theoretical maximum dynamic range under different conditions.

the coating in proportion to its reduced size. Note that to maintain low loss of the detector, it is not necessary that the uniform thin film be low loss, because the thin film can be patterned so that only a thin isthmus with low overlap efficiency passes through the illuminated area. It is conceivable that even a 100% absorbing detector material may be utilized while still providing high effective transmission. However, patterning becomes more complex as feature sizes are diminished.

The responsivity of this detector using ITO as the partially absorbing coating can be compared to the responsivity of a typical GaAs photodiode. The photodiode responsivity is 0.8 A/W. In contrast, for a 10×10 µm bolometer operating under a bias current $I_{bias}$, 1 mW of absorbed power produces a 20° C. temperature increase, corresponding to a change in current of 7.5 $I_{bias}$ A/W for a typical ITO coating. For a bias current of 1 mA, the current responsivity is 0.0075 A/W. This is about a factor of 100 lower than a photodiode. As described earlier, this bias current produces Joule heating of the detector. For a 2000Ω bolometer, the electrical power dissipation is 2 mW.

Transparent conductive coatings such as ITO exhibiting near infrared absorption in the range of 0.5 to 5% are typically several hundred Angstroms thick. The resistivity of ITO in bulk form increases with temperature [see Z. Q. Li and J. J. Lin, Electrical resistivities and thermopowers of transparent Sn-doped indium oxide films, J. Appl. Phys. 96 (10) 5918-5920 (2004)]. However, for thin films deposited under conditions promoting conductivity by tunneling [see J. Ederth et al., Electrical and Optical Properties of thin films consisting of tin-doped indium oxide nanoparticles, Phys. Rev. B 68, 155410-1 to 155410-9 (2003)], the resistivity decreases with temperature. In general, the temperature coefficient increases in absolute value for films with higher sheet resistivity.

TABLE 3

Various bolometer design options

| Area (µm) | Coating Overlap/Abs (%) | Abs Loss (dB) | Diff Loss (dB) | Abs/Total Power (mW) | ΔT (° C.) | DynRng* (dB) | $\tau_{th}$ (µs) |
|---|---|---|---|---|---|---|---|
| 10 × 10 | 95/1 | 0.04 | 0.000 | 9.5/1000 | 200 | 56 | 100 |
| 1 × 10 | 25/4 | 0.04 | 0.001 | 9.5/1000 | 428 | 59 | 10 |
| 10 × 10 | 95/5 | 0.21 | 0.000 | 4.8/100 | 100 | 53 | 100 |
| 1 × 10 | 25/20 | 0.22 | 0.026 | 5/100 | 225 | 56 | 10 |
| 1 × 10 | 25/15 | 0.17 | 0.014 | 3.75/100 | 169 | 55 | 10 |
| 1 × 10 | 25/10 | 0.11 | 0.006 | 2.5/100 | 113 | 53 | 10 |
| 1 × 10 | 25/5 | 0.05 | 0.001 | 1.25/100 | 56 | 50 | 10 |
| 1 × 10 | 25/1 | 0.01 | 0.000 | 0.25/100 | 11 | 43 | 10 |

*Dynamic Range theoretical max assuming resistance change resolution of electronics is 1 ppm and $\alpha_{ITO}$ = 0.00180/° C.

Figure 15:
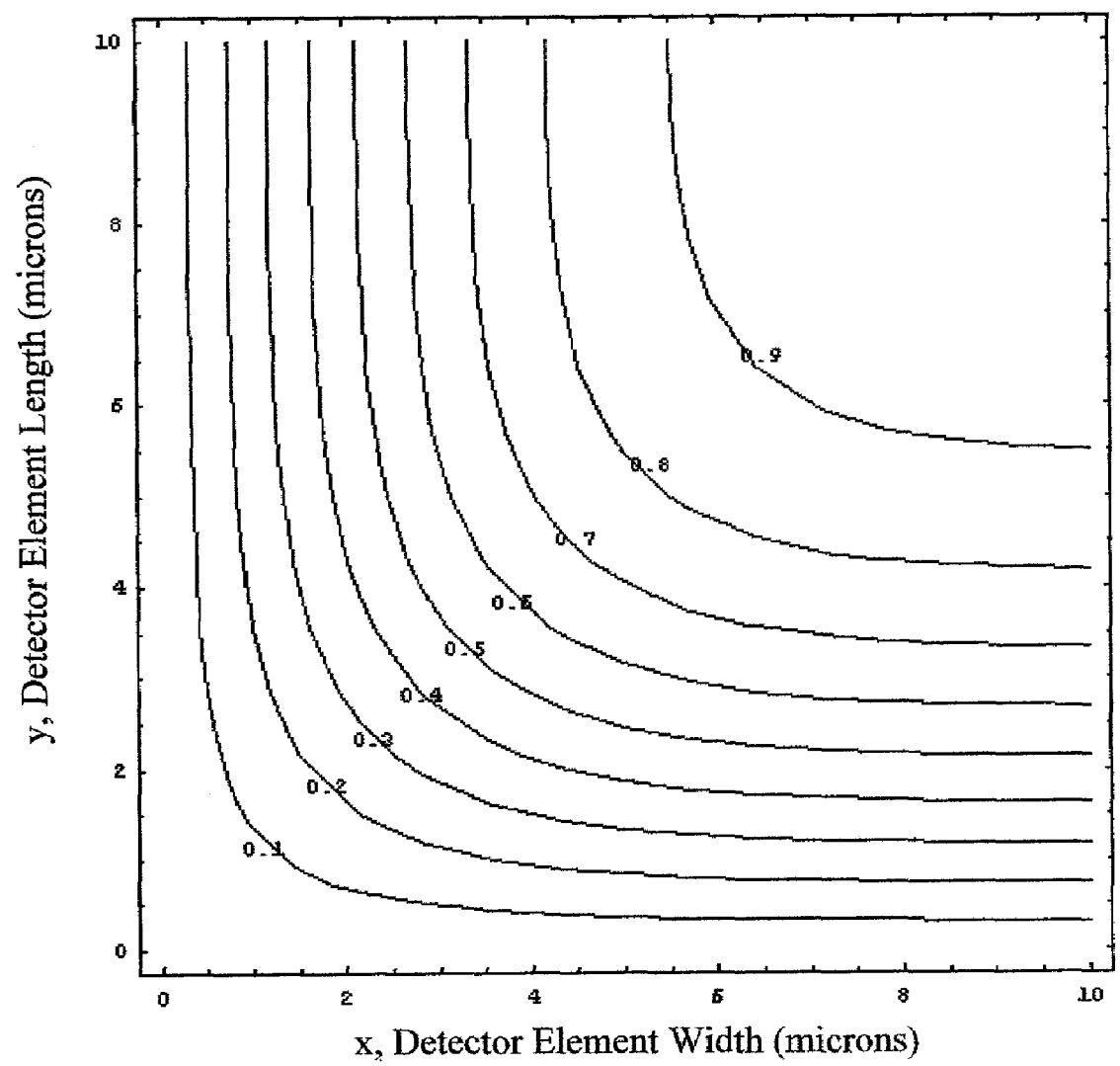
FIG. 15 plots the fractional overlap efficiency of the patterned transmissive detector element with the optical mode of a standard single mode fiber, for a range of transmissive detector geometries.

The overlap efficiency of the detector and the optical mode increases as the detector size increases. FIG. 15 is a contour plot of the overlap efficiency for a range of x and y detector dimensions, assuming the detector is centered on the 10 micron Gaussian optical mode (typical of single mode fiber). Note that the efficiency increases sub-linearly with detector area, while earlier analysis has shown that detector speed decreases linearly with area. Therefore, it is advantageous to minimize the detector area to increase speed and maintain the same temperature increase for a given amount of transmitted optical power by increasing the absorption of The resistivity of ITO has been reported to be as low as 0.0001 ohm-cm for relatively thick, dense films. Therefore, the estimated sheet resistivity for a 7 nm thick coating is 143Ω.

The resistivity of thin, unprotected transparent conductors may drift because of chemical changes in the film. The application of ITO to a connector interface does significantly isolate the coating from the environment, because the coating region is effectively embedded within a fused silica/zirconia structure. The use of the bridge configuration patterned from the same coating on the same substrate helps to factor out any residual drift. To further improve the stability, the transparent conductor may be partially overcoated with a dielectric layer such as $SiO_2$, to encapsulate the conductor and mitigate any chemical changes in the film during the lifetime of the device. Potentially, this coating can simultaneously serve as an antireflection coating to reduce backreflections. In some applications, the detector element may be part of an optical component hermetically packaged in a dry environment such that stable electrical characteristics are maintained.

In addition to ITO, various other conductors applied as thin films are potentially of use for transmissive bolometers. Table 4 below lists some common materials and their corresponding bulk temperature coefficient of resistivity (TCR). Note that materials such as gold and silver do not adhere well to polished glass, so an additional adhesion layer must be provided. Semiconductors such as silicon and germanium can be advantageously incorporated, having a TCR an order of magnitude larger than common metals.

TABLE 4

| Detector Material | Bulk Temperature Coefficient of Resistivity (1/° C.) |
| --- | --- |
| Silver | 0.0061 |
| Copper | 0.0068 |
| Aluminum | 0.00429 |
| Tungsten | 0.0045 |
| Iron | 0.00651 |
| Platinum | 0.003927 |
| Carbon | −0.0005 |
| Germanium (dependent on dopant level) | −0.05 |
| Silicon (dependent on dopant level) | −0.07 |
| Nickel | 0.005 |
| Nichrome | 0.0002 |
| Gold | 0.004 |

Applications

The transmissive photodetectors in accordance with the invention enhance the functionality of most, if not all, passive and active fiberoptic components used in today's communications networks. The complexity inherent in diagnosing failures in a system comprised of complex fiberoptic components presents unique challenges because of the difficulty in probing the optical signal. While electrical systems are readily probed to monitor electrical signal levels, the probe points in a fiberoptic system have been limited to those locations wherein bulky fiberoptic tap couplers have been preinstalled. The components add cost, complexity, insertion loss and have the potential for failure. As a result, their use is limited.

The use of conductive, partially absorbing thin films applied to existing waveguide to waveguide interfaces, such as patchcord connections (fiber-to-fiber), collimator to planar waveguide, or collimator to bulk optic all have the potential for optical monitoring functionality. Because of the inherently low effective absorption of the film, this approach can be implemented without compromising the link loss budget. Every fiberoptic component by definition already has at least one existing interface suitable for power monitoring. Components include optical switches, cross connects, amplifiers, wavelength division multiplexers and demultiplexers, add/drop filters, reconfigurable add/drop filters, lasers, receivers, photodetectors, network monitors, wavelength lockers, interleavers, attenuators, modulators, transceivers, triplexers, power splitters, couplers, tunable filters, isolators, circulators, polarization controllers, fiber Bragg gratings, dispersion compensators, etc. Furthermore, components are also evolving to greater numbers of arrayed ports making the cost of active monitoring relatively high.

FIG. 9 illustrates a pair of opposed and aligned multifiber ferrules 59 and 59', wherein ferrule 59' is shown substantially cutaway to highlight the patterning of the face of ferrule 59. A linear array of patterned thermal detectors 49-1 and 49-2 are formed in transparent conductive coating 20. Each detector channel has its own contact pads 20-3. FIG. 9 illustrates a complete bridge with four resistors per optical channel patterned on the fiber-ferrule endface, potentially only a single resistive detector element 49-1 or a resistive detector element 49-1 and a single resistive reference element 49-2 need be utilized. A series of fibers 10 with cores 12 are embedded within the array substrate of fused silica, for example. Such an array incorporates single mode and/or multimode optical fibers within the ferrule. The input optical signal 50 is launched at one end and the output optical signal 51 exits the ferrule/fiber assembly 59. Typically, ferrule/fiber assembly 59 is mated to a second ferrule/fiber assembly (not shown in cutaway view) to maintain the optical power within the optical fiber. The optical power is provided by light source(s) 55 coupled to ends of fiber 10.

Figure 10:
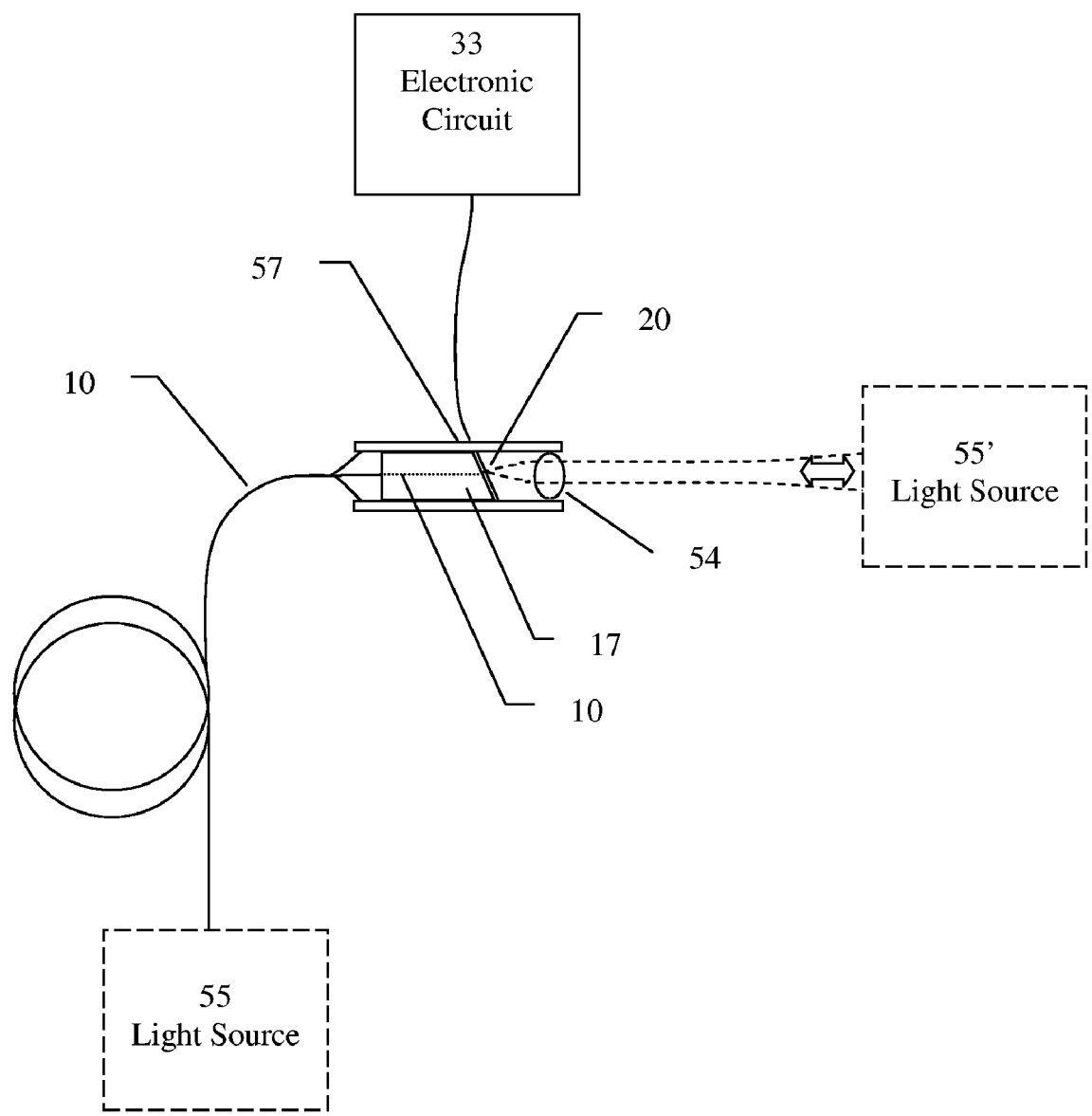
FIG. 10 illustrates a fiberoptic collimator with optical power monitoring feature.

FIG. 10 illustrates a microoptic collimator assembly which includes a patterned ITO coating 20 on the angled face of a fiber optic ferrule 17. Electronic circuit 33 measures changes in the electrical characteristics of coating 20 and converts these changes into an electrical output proportional to optical power or optical energy. The collimator lens 54 converts light diverging from a fiber optic pigtail 10 to a collimated beam. The entire assembly is aligned concentrically by a precision glass ceramic or metal sleeve 57. To achieve long working distance and low loss, the lens 54 is typically an aspherical "c" lens formed from a polished graded index rod or molded asphere. Note that the transmissive detector measures optical illumination propagating in both directions; in fact, it measures the sum of the backward and forward propagating illumination passing through the transmissive detector film 20 originating from both light sources 55 and 55' in FIG. 10. Light sources 55 and 55' can emit at the same wavelength or at different wavelengths, and detector film 20 will sense the light if those wavelengths lie within an absorption band of the detector film. The detection process is independent of the propagation direction, and for small incidence angles with the detector film 20, is also independent of optical polarization. Significant polarization selective response of film 20 is possible with incidence angles greater than about thirty degrees.

Figure 11:
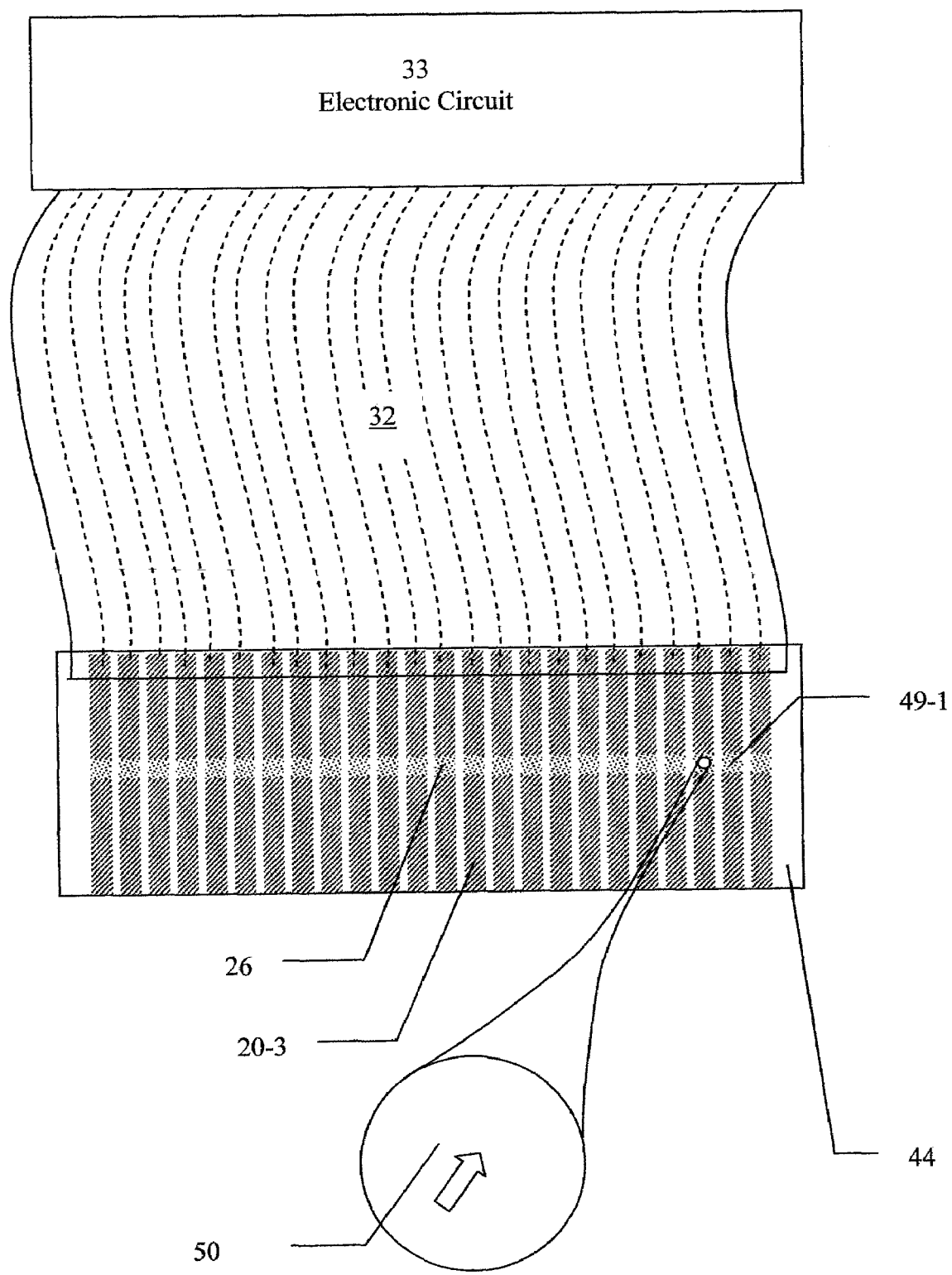
FIG. 11 illustrates a one dimensional transmissive thermal detector array.

In an additional embodiment of the invention, transmissive thermal linear detector arrays (FIG. 11) can be formed on substrates 44 with large numbers of detector elements 49-1. To ensure that the resistance of each detector element is dominated by the ITO detector element 49-1 rather than the fan-out region, a low resistance conductive coating (e.g. gold) may be coated on the fan-out electrodes pads 20-3, which are interfaced with a flexicable 32. An optical input beam 50 impinges on the detector array and intersects the detector elements 49-1. These detector channels may be wavelength specific and spatially dispersed by a diffraction grating demultiplexer front end, for example.

Figure 12:
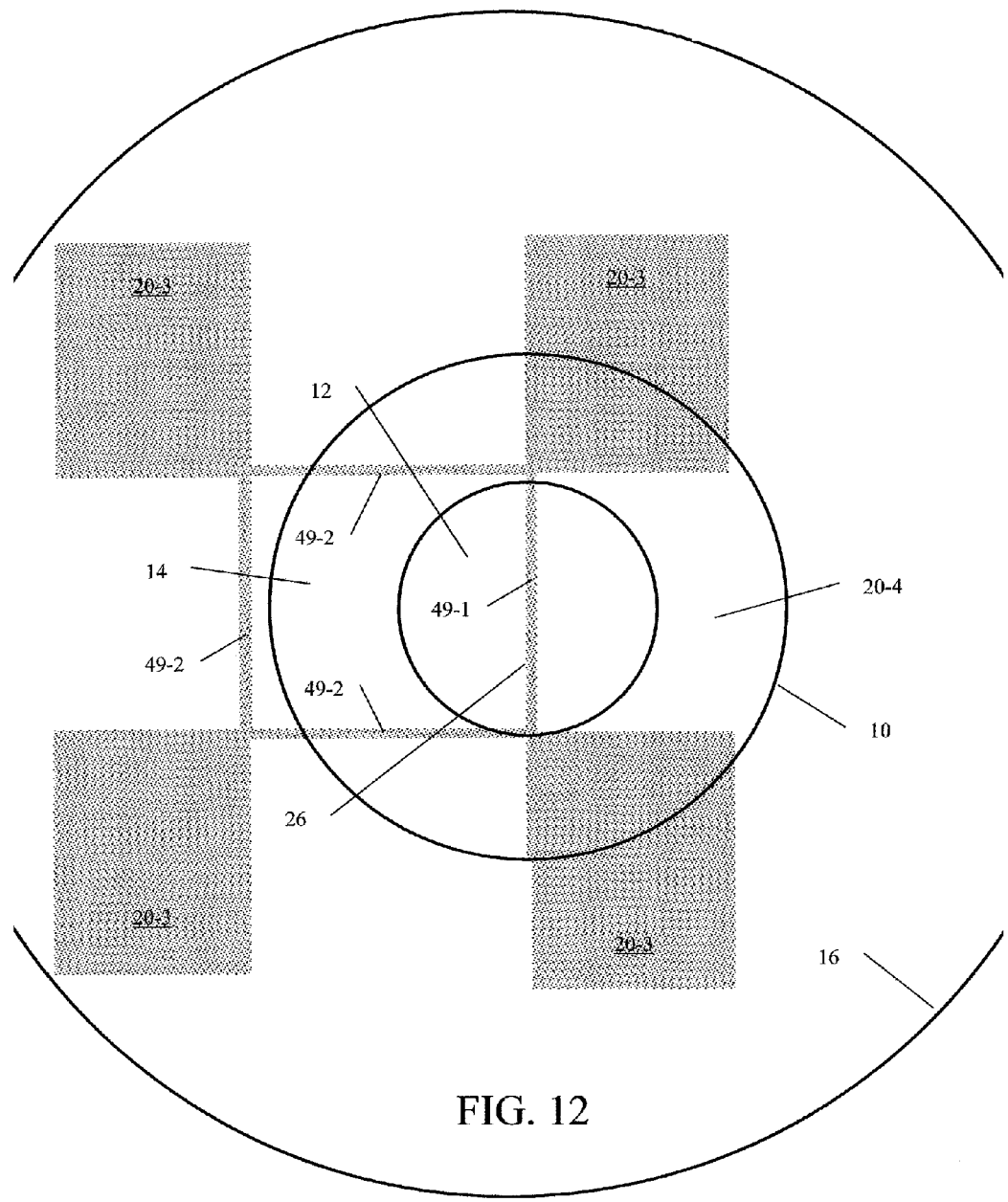
FIG. 12 illustrates a patterned thermal detector on a multimode fiber endface.

FIG. 12 illustrates a partial, magnified end-face view of a detector element coated on a multimode fiber 10 within a fiberoptic ferrule 16. For multimode optical power monitors, the optical fiber core 12 diameter is usually 50 to 62.5 μm. Therefore, for the same optical power as a single mode optical fiber, the intensity in the core is 25 to 30 times lower.

To produce an equivalent level of heating as the single mode detector, the detector isthmus 26 is narrower and the ITO film is more absorptive (by increasing the ITO thickness, for example). The net optical absorption of the signal is maintained at a low level because most of the light passes outside of the absorptive stripe. A net absorption of 1 to 5% is produced across the larger modes, even though the ITO absorption may be greater than 50%. While the absorptive stripe leads to diffractive loss, this excess loss is relatively small, as summarized in the sixth column of Table 3.

Figure 13:
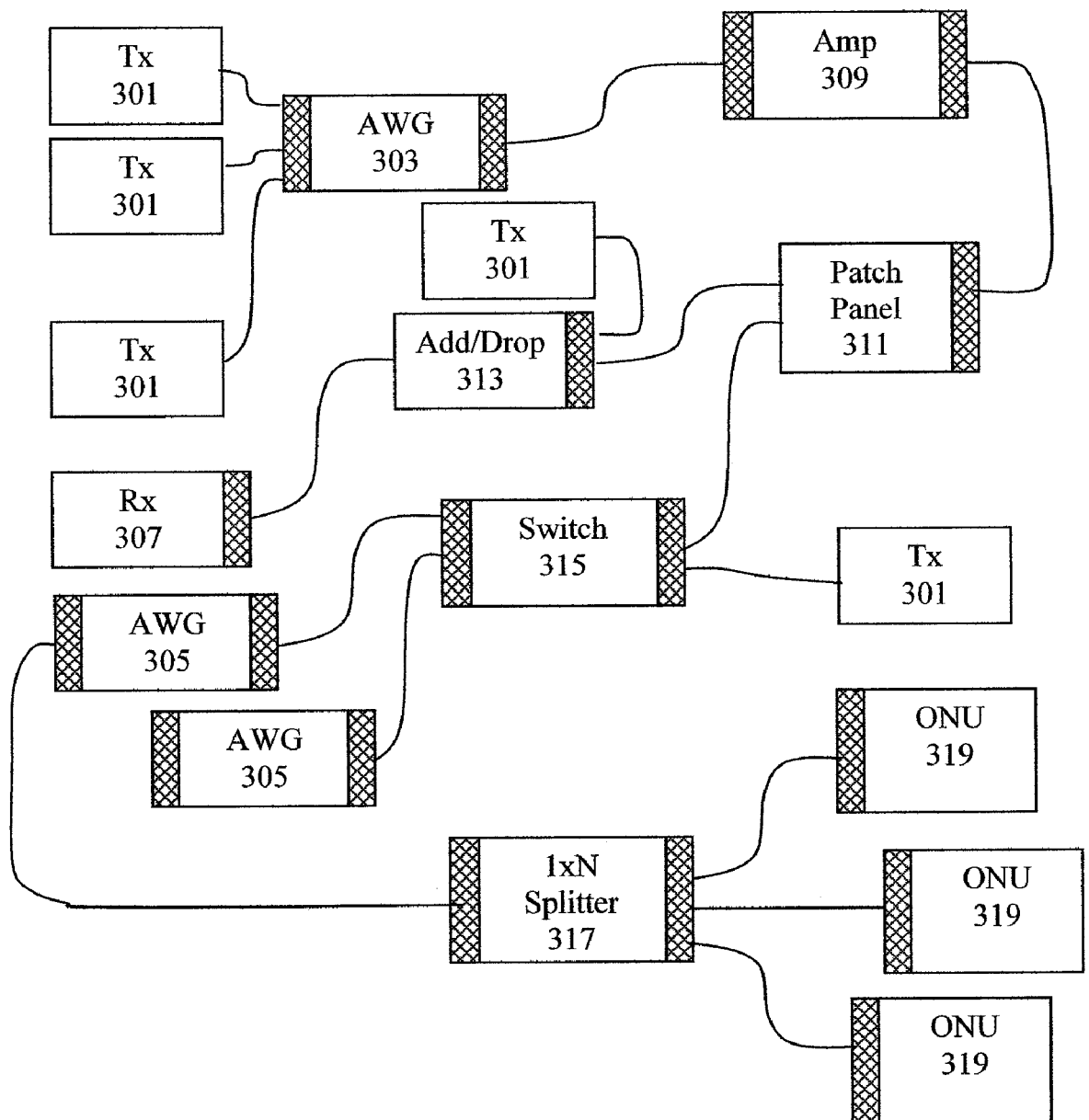
FIG. 13 illustrates, in block diagram form, an example optical network.

Optical monitoring functionality enhances the performance of components and subsystems within today's optical network. FIG. 13 depicts an example of a highly connected optical network. Key locations for low loss transmissive detectors are indicated by the cross hatched blocks. The monitoring capability, when combined with monitoring software, can significantly enhance the reliability, performance and uptime of the optical network. Fiberoptic components and devices with transmissive detectors (cross hatching) on both their inputs and outputs (such as amplifier 309, switch 315, splitter 317) have the potential to provide optical health monitoring functionality by measuring the changes between input(s) and output(s) optical power levels. If the ratio of output to input power decreases, this may be a sign that the component or device is degrading and about to fail. Therefore, unique components which monitor their internal insertion loss can be provided by use of transmissive detectors.

In particular, components such as arrayed waveguide grating (AWG) multiplexers and demultiplexers 305 can include thermal-type transmissive detectors on each input and output. Typical AWG's are fabricated of silica glass and do not incorporate electrically/optically active materials suitable for detection. However, for an eighty channel, 50 GHz demultiplexer, it is cost effective to pattern eighty one detectors on the polished edges or fiber array faces of the AWG. This is in contrast to today's state-of-the-art, in which eighty one discrete tap splitters and eighty one discrete photodetectors would be needed.

Figure 14:
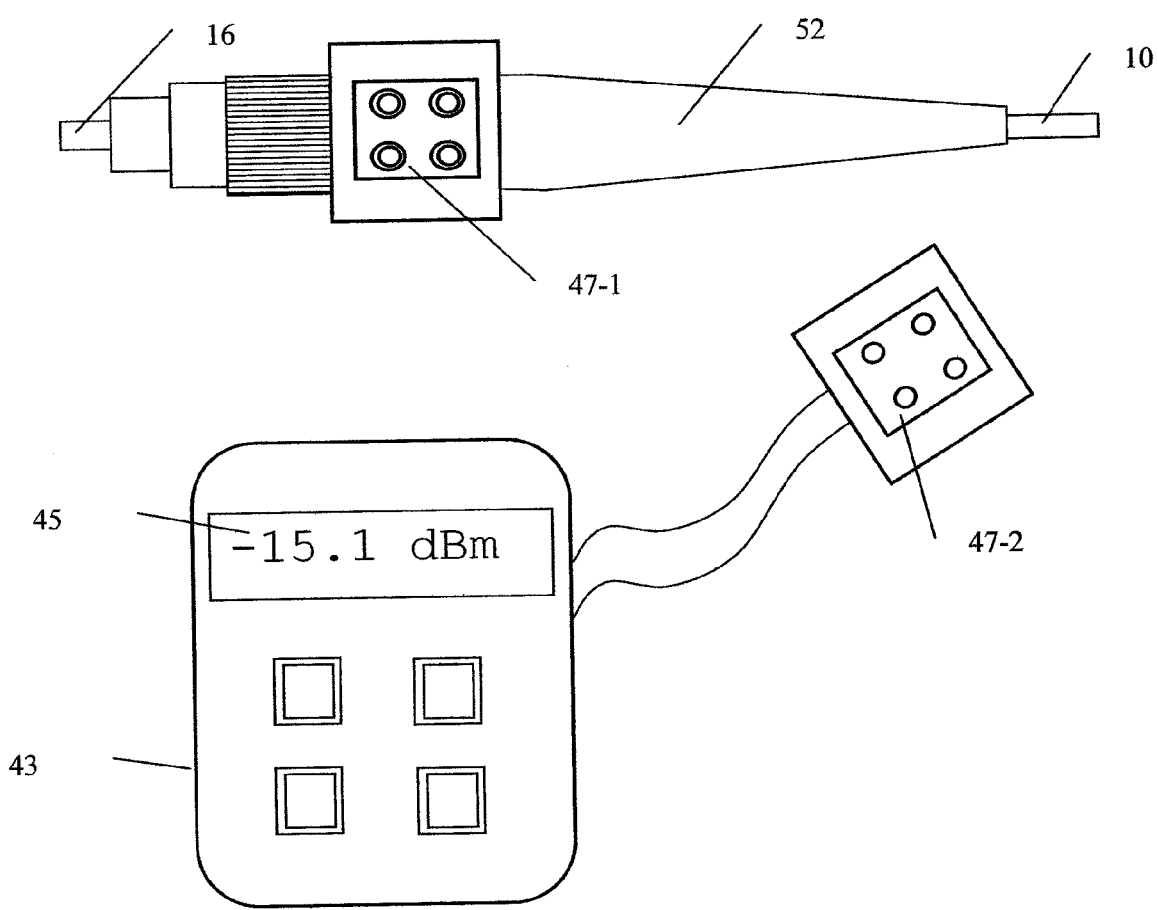
FIG. 14 illustrates a compact fiberoptic connector interface incorporating an in-fiber thermal power detector and a handheld electronic detection and display circuit.

In accordance with the invention, fiberoptic patchcords with integrated sensors to monitor the condition of the patchcord can be produced in an economical fashion (FIG. 14). For example, the polished fiber ferrule 16 is coated with a partially absorbing bolometer coating 20. The electrical contacts to one or more thin film resistors patterned on the fiber/ferrule endface are attached to electrical contacts 47-1 on the outer connector body 52. Typically, three to four contacts are necessary. To monitor or sample the optical power within the patchcord, the connector 47-2 on electronic module 43 is plugged into the mating contacts 47-1 and the optical power level is read displayed on 45.

The coating and patterning of the detector comprise a relatively small fraction of the cost of the patchcord, while the electronic module may consist of a high sensitivity ac bridge circuit, which adds cost. To mitigate costs, the hand-held electronics module 43, which is capable of plugging into an enhanced patchcord, would allow the optical power to be "probed" in a non-invasive fashion, much like the way voltage signals are probed in electronics.

The transmissive detectors disclosed in this invention are nominally wavelength independent. However, by incorporating the transparent conductive coating with a wavelength selective optical element, wavelength specific tap detectors can be produced. For example, a wavelength dependent detector response can be produced by placing an ITO layer between partially reflecting mirrors forming a Fabry-Perot etalon. Only particular wavelengths resonate within the etalon. Since optical power at these wavelengths cycle back and forth through the etalon multiple times while non-resonant wavelengths pass through only once, the etalon resonantly enhances absorption by the detector at the particular wavelengths. In one example, it may be necessary to monitor the power independently for each wavelength channel in a system incorporating coarse wavelength division multiplexing (CWDM) with up to 16 wavelength channels carrying data on a single fiber with ITU standard spacing of 20 nm spanning wavelengths from 1310 nm to 1610 nm. For example, this would require an etalon with 3 µm etalon mirror separation, which provides a free spectral range greater than or equal to 300 nm A finesse of 100 would cause the resonant wavelengths to pass through the conductive film approximately 100 times on average. If the conductive film absorbs 5% per pass, then after 100 passes, about 99.5% of light at resonant wavelengths would be absorbed. In this example, non-resonant light passes through substantially unattenuated and resonant light is strongly absorbed.

Alternately, a thin film DWDM filter may be incorporated with the transmissive detector thin film coated on the transmission side, such that only the optical power in a transmission band of the thin film interference filter is measured.

Figure 16:
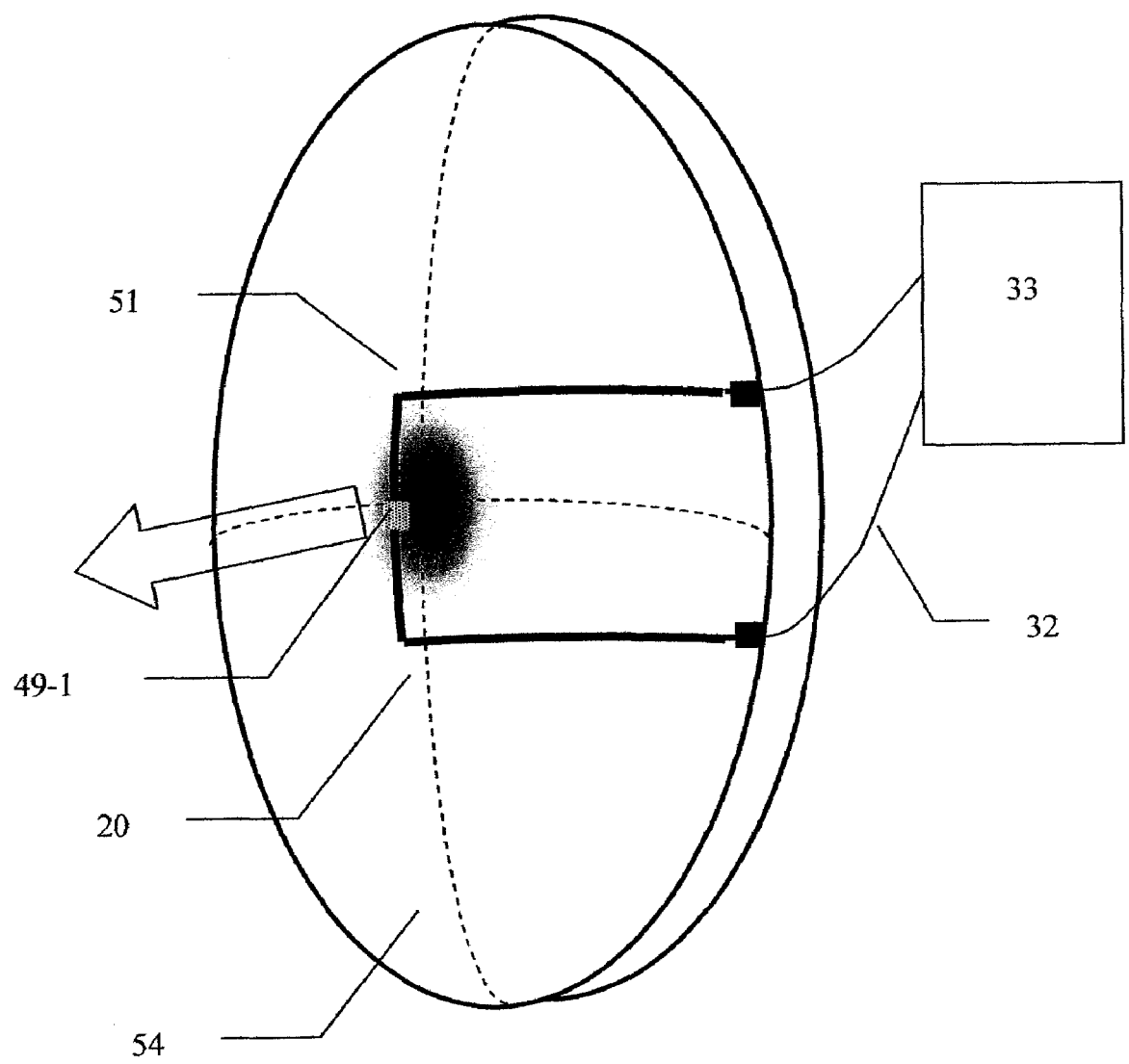
FIG. 16 illustrates a standard lens coated with thin film transmissive optical detector.

The transmissive detector approach disclosed in this invention also applied to substrates which are not necessarily planar. FIG. 16 illustrates a thermal detector in accordance with the invention formed on the surface of an optical lens. The resistive element 49-1 overlaps with the optical beam 51 and its resistance may be measured by an external circuit 33. The entire bridge circuit may be patterned on the surface of the lens, or additional resistive elements may be external to the lens.

Figure 17:
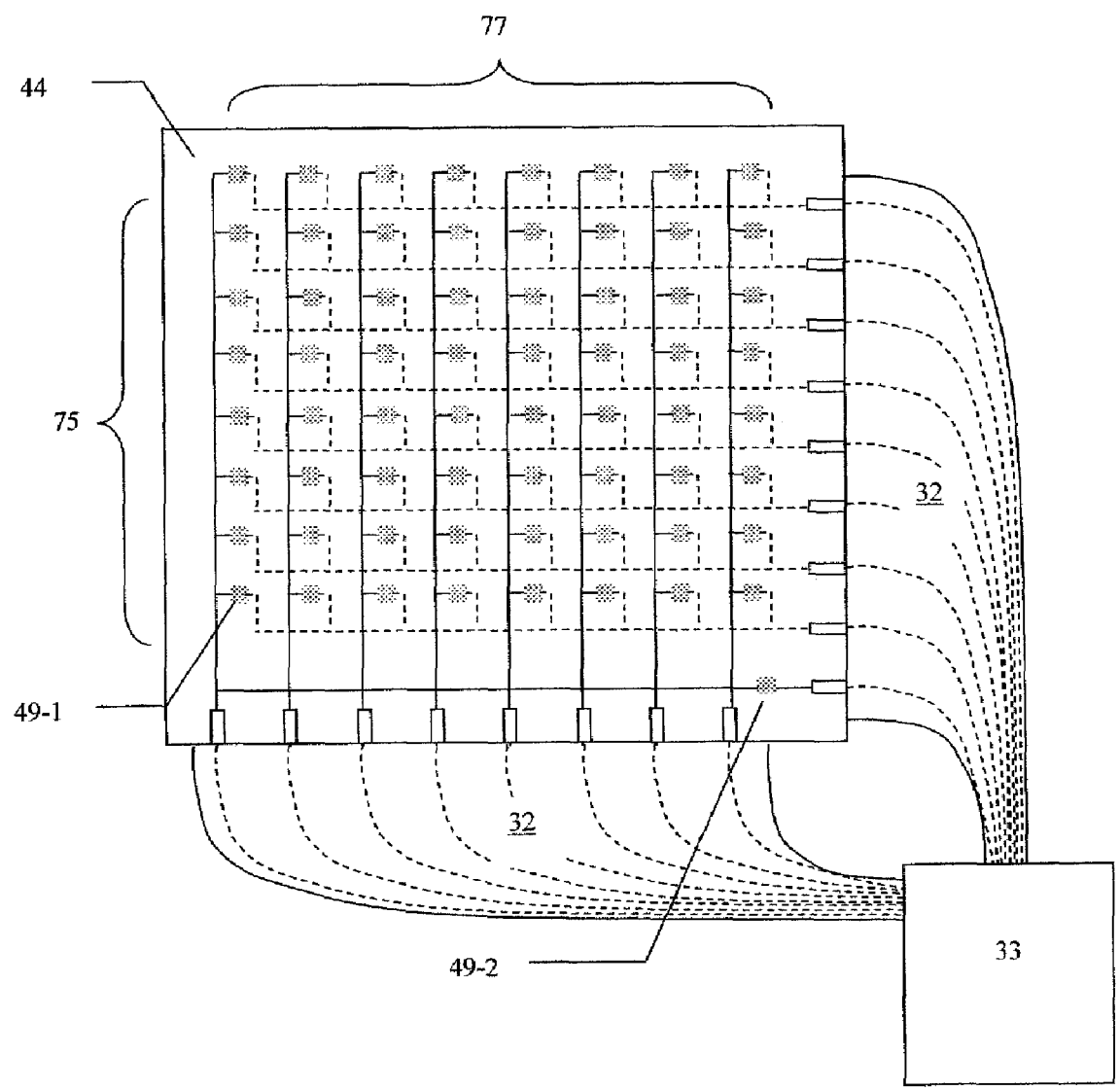
FIG. 17 illustrates a two dimensional transmissive detector array and electronic detection means.

This transmissive detector approach can also be applied to a wide range of geometries, including various multi-detector arrangements. Thermal detectors can be arrayed in two dimensions on a transparent substrate, as ilustrated in FIG. 17. Each detector element 49-1 is addressed by selecting the appropriate row 75 and column 77 conductive traces. Electrical interconnects between the array and the driver circuit 33 can be made by the use of flexicables 32, for example. One or more reference detectors 49-2 may be patterned on the transparent array substrate 44.

The unique functionality provided by this thin film optical detector extends beyond traditional telecommunications networks to glass or plastic optical fiber communications systems in the automotive, aerospace and industrial sectors. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A device for measuring the optical energy propagated along an optical waveguide having an energy concentrating core without materially attenuating the power of the transmission, comprising:

an optical element encompassing and in-line with the core and having an end face substantially transverse thereto;

a conductive coating disposed on the end face in juxtaposition to the core, the coating having an optical energy absorbing characteristic dependent on its thickness and a thickness such as to absorb less than about 5% of the total optical energy, the coating including a pattern of separated areas disposed radially about the core and narrow junctions interconnecting the separated areas, at least one of the junctions being in alignment with the core of the waveguide, and a circuit coupled to the separated areas for measuring resistivity variations in the coating due to optical energy heating of the coating.

2. A device as set forth in claim 1 above, wherein the coating is indium tin oxide of approximately 50 Å to 500 Å thickness and wherein the junctions are less than about 100 square microns in area.

3. A device as set forth in claims 1 above, wherein the separated areas in the coating define quadrants separated by radial channels outside an intermediate region and the junctions bridge the quadrant pairs within the intermediate region, one of the junctions being in the path of optical energy from the core.

4. A device in accordance with claim 3 above, wherein the four junctions between quadrant pairs are arranged in a bridge circuit configuration, and wherein the voltage difference between the junction in the path of optical energy from the core and a junction outside of the path of the optical energy provides a measure of the optical energy.

5. A device as set form in claim 3 above, wherein the coating within the intermediate region is indium tin oxide and the coating outside the intermediate region is indium tin oxide overcoated with 100 to 1000 nm thick metallic coating of chrome-nickel-gold.

6. A device as set forth in claim 1 above, wherein the device comprises two optical waveguides in end-to-end relation and the optical element is coupled to one of the waveguides and in-line therewith, and the optical energy transmitted between the waveguides undergoes less than 0.50 dB loss.

7. A device as set forth in claim 6 above, wherein the device comprises opposing fiber stubs coupled to the separate optical waveguides, and having opposing faces, one of which bears the coated pattern, and a conductive element disposed between the opposing faces of the fiber stubs, and having separate sections in contact with the separated areas of the coating and electrical leads therefrom to the circuit.

8. A device as set forth in claim 7 above, wherein the device further includes a split sleeve encompassing the fiber stubs to maintain concentricity and an elastomeric annulus disposed between the opposing fiber stubs to contact the conductive elements with the pads, and wherein the end face is at an angle of approximately 8° to a plane perpendicular to the path from the core.

9. A device as set forth in claim 1 above, wherein the optical element comprises a substrate, and the device further includes a first planar element adjacent thereto having a pattern of low resistivity material thereon defining a gap intercepting the path of the illumination from the core, and a second planar element in contact with the first element, the second element being a coating of high resistivity, light transmissive material with low light absorption properties including a target area in the path of the illumination, and wherein the circuit is coupled to the surfaces of low resistivity on opposite sides of the gap, for detecting the amount of optical energy absorption at the target area.

10. A compact and efficient measurement apparatus for the detection of confined optical radiation directed through a plane, comprising:

a transparent substrate coincident with said plane including a partially radiation absorbing coating therein having an optical characteristic which is substantially transparent but absorbs a small fraction of the optical radiation passing through the coating;

the coating having an electrical characteristic which changes in relation to the amount of optical radiation power absorbed in the coating, and a circuit coupled to the substrate for detecting changes in the electrical characteristics.

11. A device in accordance with claim 10, wherein the coating is indium tin oxide of 50 to 500 angstroms thickness.

12. A device in accordance with claim 11, wherein the coating is patterned to form one or more conductive isthmuses on the transparent substrate which intersect the spatially confined optical radiation, wherein the width of the conductive isthmuses is less than the width of the spatially confined optical radiation.

13. A device in accordance with claim 12, wherein said electrical characteristic is substantially the resistances measured across the conductive isthmuses.

14. A device in accordance with claim 13, wherein the coating is additionally patterned to produce one or more conductive isthmuses which do not intersect the spatially confined optical radiation and are patterned to be substantially identical in characteristics to the one or more conductive isthmuses which intersect the spatially confined optical radiation.

15. A device in accordance with claim 14, wherein the coating is patterned to produce a first conductive isthmus which intersects the spatially confined optical radiation and second, third and fourth conductive isthmuses which do not intersect the optical radiation, wherein the second, third and fourth conductive isthmuses are patterned to be substantially identical in characteristics to the first conductive isthmus to form a balanced resistive bridge circuit.

16. A device in accordance with claim 15, wherein the effect of transmitted optical radiation power and ambient temperature on the resistivity of the first, second, third, and fourth conductive isthmuses arranged in a resistive bridge circuit is determined by measuring the voltage difference between the first and second conductive isthmuses and for improved precision also measuring the current into the bridge circuit.

17. A device in accordance with claim 10, wherein said fraction of optical radiation absorbed by coating ranges from 1 to 10% at the wavelength to be detected.

18. A device in accordance with claim 10, wherein the device includes one or more optical waveguides having endfaces, and the transparent substrate comprises the shared plane of the endfaces.

19. A device in accordance with claim 18, wherein the optical waveguides consist of devices selected from the class comprising one or more single mode optical fibers, multimode optical fibers, and planar optical waveguides.

20. A device in accordance with claim 18, wherein the transparent substrate includes one or more polished, single mode optical fiber endfaces coated with an approximately 100 Angstrom thick indium tin oxide film, the width of the conductive isthmus is 1 to 5 microns, the length is approximately 10 microns, and the fiber endface is angled relative to the waveguide longitudinal axis by greater than 5 degrees thereby to reduce the strength of the optical backreflection from the conductive isthmus which is coupled back into the waveguide.

21. The method of measuring optical power in an optical wave transmission device without materially attenuating the transmission itself, comprising the steps of:

converting a minor proportion of the optical energy to thermal energy across a first segment of the device which intersects the path of the optical energy transmission in the device:

varying a resistance of value change due to thermal energy change in the first segment to degree that is disproportionate relative to the thermal energy change measuring the resistance of a second segment of the device that is responsive to ambient temperature changes in the device independently of the optical power; and converting the relative resistance variation between resistances derived responsive to the changes at the first and second segments to an electrical signal as a measurement of optical power.

22. A method as set forth in claim 21 above, wherein:

the optical energy is converted in the first segment to thermal energy within a short path length distributed across at least a part of the area of transmission, and the conversion is effected by absorption of optical energy in the short path length.

23. A method as set forth in claim 22 above, wherein the step of converting a minor proportion of the optical energy to thermal energy across the first segment of the transmission comprises intercepting the energy concentrating core of a transmission in a sensor area having less than 100 microns$^2$ of area, and wherein the step of converting optical energy to thermal energy is performed within a path length of less than about 500 Å, and wherein the conversion of resistance variation to an electrical signal includes increasing sensitivity by concentrating current through the sensor area by passing it to and from the sensor array via relatively larger conductive areas.

* * * * *